(12) United States Patent
Holden

(10) Patent No.: US 12,447,040 B2
(45) Date of Patent: Oct. 21, 2025

(54) OSTOMY POUCH

(71) Applicant: ConvaTec Limited, Flintshire (GB)

(72) Inventor: Clare Holden, Flintshire (GB)

(73) Assignee: CONVATEC LIMITED, Flintshire (GB)

( * ) Notice: Subject to any disclaimer, the term of this patent is extended or adjusted under 35 U.S.C. 154(b) by 847 days.

(21) Appl. No.: 17/335,584

(22) Filed: Jun. 1, 2021

(65) Prior Publication Data

US 2021/0369491 A1 Dec. 2, 2021

Related U.S. Application Data

(63) Continuation of application No. PCT/GB2021/051340, filed on Jun. 1, 2021.

(30) Foreign Application Priority Data

Jun. 2, 2020 (GB) ...................... 2008262

(51) Int. Cl.
*A61F 5/445* (2006.01)
(52) U.S. Cl.
CPC .................... *A61F 5/445* (2013.01)
(58) Field of Classification Search
CPC .... A61F 5/445; A61F 5/443; A61F 13/00085; A61F 13/0259; A61F 2013/008
See application file for complete search history.

(56) References Cited

U.S. PATENT DOCUMENTS

| 5,429,626 | A | * | 7/1995 | Fenton | .................... | A61F 5/448 |
| | | | | | | 604/339 |
| 6,336,918 | B1 | | 1/2002 | Olsen | | |
| 2005/0273064 | A1 | * | 12/2005 | Dircks | .................... | B32B 33/00 |
| | | | | | | 604/322 |

(Continued)

FOREIGN PATENT DOCUMENTS

| EP | 3096718 A1 | 7/2015 |
| GB | 2512655 A | 10/2014 |

(Continued)

OTHER PUBLICATIONS

International Search Report; European Patent Office; International Application No. PCT/GB2021/051340; Sep. 13, 2021; 3 pages.

(Continued)

*Primary Examiner* — Ariana Zimbouski
*Assistant Examiner* — Alessandro R Del Priore
(74) *Attorney, Agent, or Firm* — TAFT STETTINIUS HOLLISTER LLP; Ryan O. White; Derek B. Lavender

(57) ABSTRACT

An ostomy pouch includes a sheet of woven comfort material. The sheet of woven comfort material has an outside surface and an opposite inside surface. The outside surface of the sheet of woven comfort material forms at least part of the outside surface of the pouch, and at least part of the inside surface of the sheet of woven comfort material is coated with a web of hot-melt adhesive. A method of forming a sheet of comfort material for an ostomy pouch involves coating one side of a sheet of woven comfort material with a web of hot-melt adhesive to provide an inside surface comprising the coating. The web comprises a mass with a plurality of voids therein.

9 Claims, 8 Drawing Sheets

(56) References Cited

U.S. PATENT DOCUMENTS

| | | |
|---|---|---|
| 2008/0269701 A1 | 10/2008 | Dircks et al. |
| 2008/0300556 A1* | 12/2008 | Fenton ................ A61F 5/4404 604/339 |
| 2011/0174317 A1 | 7/2011 | Martin |
| 2011/0238024 A1 | 9/2011 | Smith et al. |
| 2016/0135983 A1* | 5/2016 | Murray ................ A61F 5/4407 604/335 |
| 2017/0079846 A1* | 3/2017 | Locke ................ A61F 13/0289 |
| 2017/0209295 A1 | 7/2017 | Smith et al. |
| 2020/0246178 A1 | 8/2020 | O'Hamill et al. |
| 2021/0077319 A1* | 3/2021 | Weber .................... A61F 13/47 |

FOREIGN PATENT DOCUMENTS

| | | |
|---|---|---|
| WO | 2008112337 A1 | 9/2008 |
| WO | 2010122347 A1 | 10/2010 |
| WO | 2021064409 A1 | 4/2021 |

OTHER PUBLICATIONS

Written Opinion of the International Searching Authority; European Patent Office; International Application No. PCT/GB2021/051340; Sep. 13, 2021; 5 pages.
International Search Report; European Patent Office; International Application No. PCT/GB2021/051341; Sep. 9, 2021; 4 pages.
Written Opinion of the International Searching Authority; European Patent Office; International Application No. PCT/GB2021/051341; Sep. 9, 2021; 6 pages.
JP Office Action; Japanese Patent Office; Japanese Patent Application No. 2022-573185; Jul. 8, 2025; 6 pages.
JP Office Action; Japanese Patent Office; Japanese Patent Application No. 2022-574318; Jul. 8, 2025; 8 pages.

* cited by examiner

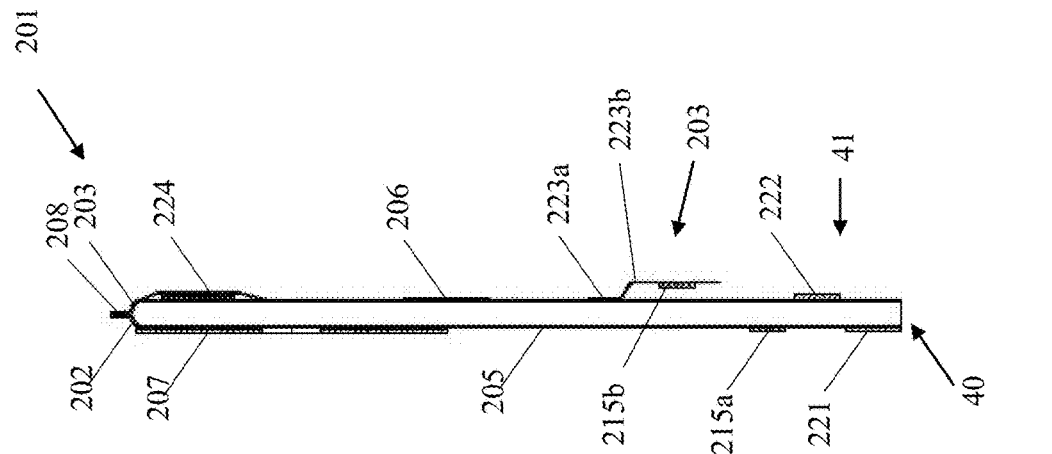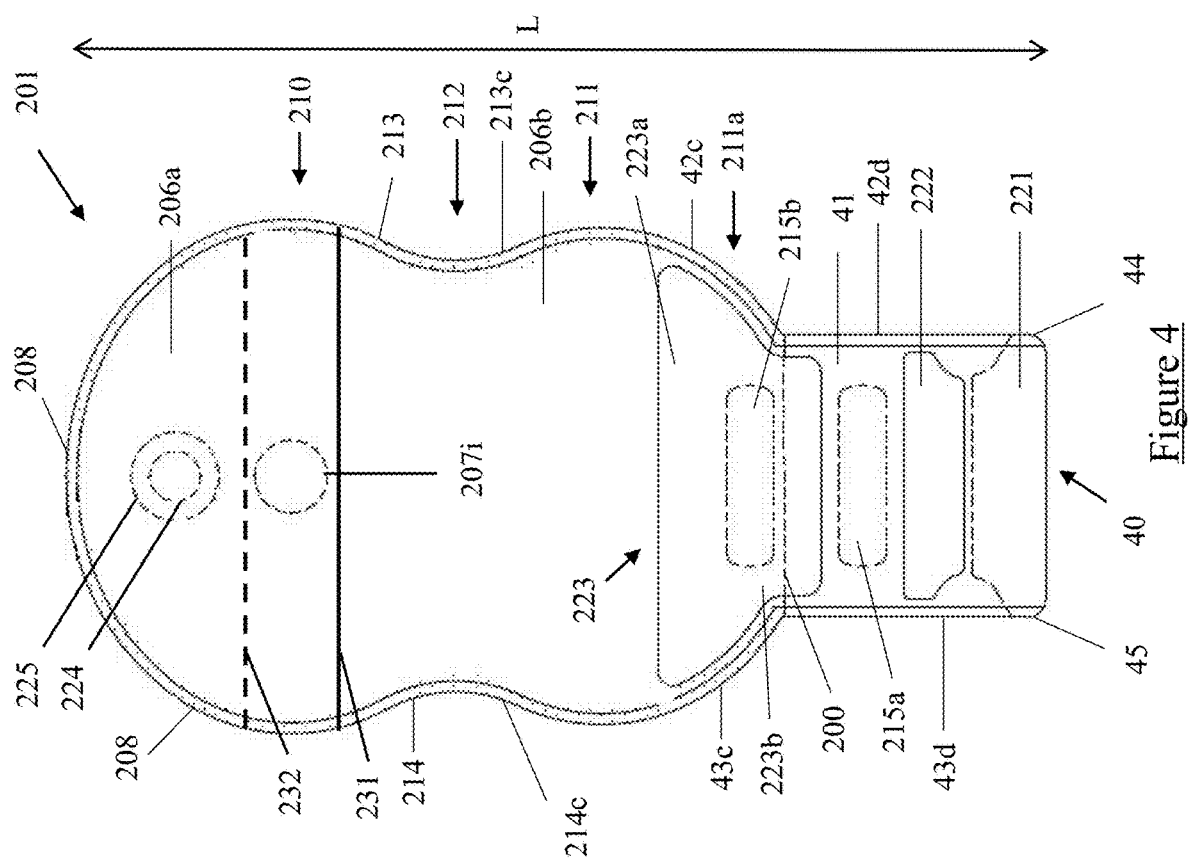

OSTOMY POUCH

CROSS-REFERENCE TO RELATED APPLICATIONS

This application is a continuation of International Application No. PCT/GB2021/051340 filed Jun. 1, 2021 and claims the priority of foreign Application No. GB2008262.4 filed Jun. 2, 2020. The disclosures of which are hereby incorporated herein in their entirety.

TECHNICAL FIELD OF THE INVENTION

The present invention relates to an ostomy pouch for managing effluent from a stoma.

BACKGROUND TO THE INVENTION

There are many forms of ostomy pouch, for example, open and closed, one-piece or two-piece. Pouches may have various shapes and various components. Typically they comprise a cavity formed of a (normally plastic) film, frequently formed by two layers, front and rear, welded together at their periphery, with the rear layer of film (closest to the ostomate's body in use) including an aperture through which effluent can enter the pouch.

For the comfort of the ostomate, a "comfort layer" can be provided, overlying the rear film layer, and normally the front film layer too. The comfort layer is made of a material that is more comfortable against the skin than the film. Normally, the comfort layer is a non-woven material—non-woven materials are chosen for features such as cost and ease of assembly, for example because they can be easily attached to the film layers of the pouch by the same welding process that bonds the film layers to one another at their periphery.

More recently, however, as part of efforts to make ostomy pouches seem less "medical", and more attractive to users, woven materials have been introduced as the comfort material of the Salts® Confidence BE® product, with the product being described in advertising material as "stylish". A woven material is more likely to be mistaken by others noticing the pouch as an undergarment, rather than as a medical appliance.

Whilst this is considered desirable, the production of an ostomy pouch with a woven comfort layer is considered to be complex. The Salts® Confidence BE® product appears to include a complete layer of specially chosen film material adjacent the woven layer. Thus in one example, moving from the ostomate out, there is: a rear woven comfort layer; an opaque rear wall defining one side of a cavity; a clear front wall defining the other side of the cavity; an opaque intervening wall; and, a front woven comfort layer. The front comfort layer is provided in two parts, top and bottom separated by a split and overlapping in the region of the split, so that the comfort layer can be pulled apart at the split to inspect the contents through the clear wall. The intervening layer is similarly provided in two parts, bonded to the periphery of the two parts of the comfort layer. In this example, the intervening wall appears to avoid fraying of the edges of the comfort layer; avoid visibility of the contents; or aid in the processability of the (somewhat stretchy) fabric that it is adhered to.

This additional wall has a number of drawbacks for the pouch including: increased complexity of construction, increased cost; increased bulk, and increased noise in use as there is yet another layer which can rustle making the pouch less discreet.

Other prior art documents have also proposed use of woven materials as one option in comfort layers, for example, US2005/0273064 discloses a pouch which effectively integrates the walls of the pouch which form the cavity with the comfort layer. Thus a laminate is proposed including a fabric layer which can be a knit fabric, a woven fabric or a non-woven fabric, with the fabric layer adhered to a film layer by a layer of adhesive that substantially continuously bonds the fabric layer to the film layer. This arrangement, whilst requiring fewer layers than that of the Salts Confidence BE product suffers other disadvantages, for example, a typical comfort layer includes regions not adhered to the film layers that make up the cavity, such that the comfort layer can be pulled aside and the interior inspected, but this would not be possible with the pouch of US2005/0273064 on account of the comfort layer being substantially continuously bonded to the wall of the pouch.

It is an object of embodiments of the present invention to at least partially overcome or alleviate the above problems.

SUMMARY OF THE INVENTION

In this specification, the term "stomal output" refers to any gases or fluids or solids produced by an ostomate that may be secreted from the stoma or that exit the stoma. The stomal output may comprise stomal gas, stomal liquid and stomal solids.

In this specification, the term "stoma" refers to an opening in the body. Generally the stoma is a surgical opening in the torso of the body. In some instances, the term "stoma" also refers to internal tissue, organs or portions thereof that are exposed by the opening. By way of non-limiting example, internal tissue may be selected from colon, ileum, small intestine, large intestine, jejunum, and duodenum, and combinations thereof. The internal tissue may be an end or a loop of a small or large intestine.

In this specification, the term "ostomate" refers to a subject that may have use of the ostomy pouch disclosed herein. While ostomate usually refers to a subject with a surgical opening, as used herein, "ostomate" may refer to a subject who has a stoma, regardless of whether the stoma was created by surgery or other means.

The term "user" may refer to an ostomate, or to another person assisting the ostomate, for example, with emptying of the stomal output from the cavity.

In this specification, the ostomy pouches disclosed herein may, for example, be used for managing a stoma created by an esophagostomy, a gastrostomy, a cholecystostomy, a choledochostomy, a cecostomy, a colostomy, a duodenostomy, an ileostomy, a jejunostomy, an appendicostomy, a tracheostomy, a urostomy, a nephrostomy, an ureterostomy, or a vesicostomy. The ostomy pouches disclosed herein may be used with additional devices including, but not limited to, a shunt, a catheter, a plug or a fecal management system.

Beneficially, the ostomy pouches of the present disclosure may permit an ostomate to increase the period of use of each ostomy pouch compared to prior art pouches. This may be achieved, for example, by providing an increased cavity volume for the ostomy pouch while maintaining ostomate discretion and comfort. Additionally or alternatively, this may also be achieved by providing means for draining the cavity of stomal output reliably and hygienically so as to increase an ostomate's confidence in reusing the ostomy pouch compared to some prior art pouches. Since the ostomate may be inclined to use each ostomy pouch of the present disclosure for longer, the total number of ostomy pouches used by the ostomate in a given time period may be reduced. This may produce an environmental benefit in reducing the amount of environmental waste produced.

In this specification locations and orientations of features may be described with reference to the ostomy pouch being "in use", "orientated as it would be in use" or similar. Such terms refer to the intended orientation of the ostomy pouch when it is adhered to a body of an ostomate with the ostomate in a standing position, irrespective of whether the ostomy pouch is currently performing such a use or the actual position of the ostomate. The terms "upper" and "lower" and related terms refer to the relative position of a part or portion of the ostomy pouch when orientated as it would be in use. For example, a section of the ostomy pouch may be referred to as an "upper" section of the ostomy pouch. In such an example, said section will be intended to be the uppermost section (in the vertical direction) of the ostomy pouch when attached to the body of a standing ostomate. However the reader skilled in the art will appreciate that before attachment to the ostomate said section may not always be the uppermost section and in addition when attached the section may not always be the uppermost section if the ostomate adopts a non-standing position, for example lying down.

The terms "left-hand" and "right-hand" and related terms refer to the ostomy pouch when viewed from the rear (for example, as shown in FIG. 1). Thus, as an illustrative example, a "left-hand" edge of the ostomy pouch will be towards a left-hand side of the ostomate in the situation where the ostomy pouch is attached to the front torso of the ostomate.

The terms "concave" and "convex" and related terms refer to shaping of features of the ostomy pouch when viewed from an exterior of the ostomy pouch. Thus, as an illustrative example, an ostomy wafer of circular shape would be considered to have a convexly shaped peripheral edge.

In this specification the terms "front" and "rear" refer to the relative position of a part or portion of the ostomy pouch with reference to the body of an ostomate when the ostomy pouch is attached to the body. "Rear" refers to a position relatively closer to the body of the ostomate than a comparative position that is "front". "Front" refers to a position relatively further away from the body of the ostomate than a comparative position that is "rear".

In this specification the term "smoothly blends" and related terms refers to the smooth merging of two edges, lines or contours without abrupt changes in contour.

In this specification the term "peripheral region" refers to a portion situated on or towards an edge of the item being referred to.

The term "turned up" used herein may include folding or rolling of the components.

Ostomy pouches are commonly attached to the body by means of an ostomy wafer which includes an adhesive layer or layers. The ostomy wafer typically has an opening for the stoma sometimes referred to as a starter hole which may be cut to a required size by a user before attachment. The ostomy wafer typically comprises an adhesive layer on a body-facing side for adhering the ostomy wafer to the body of the ostomate. Typically, a release liner covers a body-facing side of the ostomy wafer that is removed by the user prior to fitting to the skin. In this specification, the term "ostomy wafer" may be used interchangeably with the terms "adapter," "wafer," "baseplate", or "layered adhesive wafer." In this specification, the term "ostomy wafer" includes ostomy wafers for a "two-piece pouch" and for a "one-piece pouch".

In this specification a "two-piece pouch" refers to a pouch where the ostomy wafer forms part of a separate body fitment component that is attached by a releasable coupling to the remainder of a pouch. A two-piece pouch permits the body fitment component to be separated from the pouch without damage, so that at least one of the parts continues to be functionally usable. For example, the body fitment component may remain in place on the body of the ostomate.

In this specification a "one-piece pouch" refers to a pouch where the ostomy wafer is permanently attached to the pouch, to the extent that the ostomy wafer cannot easily be separated without risk of damaging the pouch. A one-piece pouch is intended to be used as an integral unit.

Ostomy pouches are commonly configured as closed pouches or open pouches. In this specification a "closed pouch" refers to an pouch where it is not intended that stomal output is drained from the cavity. Thus, a closed pouch may typically be configured as a one-use, disposable and non-reusable pouch. In this specification an "open pouch" refers to an pouch where it is intended that stomal output is drained from the cavity. Thus, an open pouch may be configured as a reusable pouch, such that it can be reused and emptied multiple times whilst attached to the body, although this is not essential. In an open pouch the stomal output may be drained intermittently as instigated by an action of the ostomate or may be drained intermittently or continuously due to the cavity being fluidly connected to a drain, for example a night drain line.

According to a first aspect of the present invention, there is provided an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material has a hot-melt adhesive applied thereto.

The hot melt adhesive may be coated on at least part of the sheet of woven comfort material.

One embodiment of the invention according to the first aspect provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive.

The hot melt adhesive may be applied to the inside surface of the sheet of woven comfort material. The hot-melt adhesive may be applied as a web. The hot melt adhesive may be coated on the inner surface of the sheet of woven comfort material. Thus, the inside surface of the sheet of woven comfort material may be provided with a coating of hot-melt adhesive.

Advantageously, the pouch can be formed in a single welding process as the hot-melt adhesive facilitates the adhesion of the comfort material to the rest of the pouch during welding. This removes the need to substitute the normal materials for different, specialist materials, and the need for additional intervening layers which reduces the production complexity and cost of the pouch and makes it more discrete and comfortable for the user to wear. In addition, the hot-melt adhesive also supports the woven comfort layer and prevents undesirable breakdown of the layer such as fraying, and it moves with the comfort layer and hence does not rustle. Furthermore, the hot melt adhesive can provide increased stability to the woven comfort material during processing of the woven material down an automated manufacturing line. Still further, testing has been performed in the lab which suggests that the use of a hot melt adhesive (such as EVA in the tests) on one or more panels of the woven material aids in the reduction of 'sagging' of the pouch when full.

The pouch may have a front and a rear. The front of the pouch may be defined as generally further from the ostomate's body in use. The rear of the pouch may be defined as generally closer or adjacent the ostomate's body in use. The sheet of woven comfort material may form at least part of the front surface of the pouch. The sheet of woven material may form at least part of the rear surface of the pouch. The pouch may comprise one or more sheets of woven comfort material. The front and rear surfaces of the pouch may be both formed by sheets of woven comfort material. Where the pouch comprises two or more sheets of woven comfort material, any one of more of these sheets (and preferably both) may have an outside surface which forms at least part of the outside surface of the pouch and an opposite inside surface; wherein at least part of the inside surface of the sheet of woven comfort material is coated with a web of hot-melt adhesive.

One embodiment of the present invention therefore provides a pouch covered on both sides (front and rear) in woven comfort material that provides enhanced comfort for the user and which has a hot-melt adhesive applied thereto so that the pouch can be easily manufactured without additional welding steps or the introduction of intermediate layers. Effectively, the sheets of woven material with adhesive applied to their inside surface can be bonded to the remainder of the pouch, for example a front wall defining one side of a cavity and a rear wall defining the other side of a cavity, in just the same way as a non-woven material would be bonded—typically a single step welding process whereby the peripheries of all the layers are bonded to each other.

The woven comfort material may comprise a natural material, for example cotton or wool and/or a synthetic material, for example any one or more of polyester, nylon, viscose, polyethylene, polypropylene, or the like. The woven material may have an area density of 20 to 200 g/m², preferably 40-80 g/m², for example 58 g/m². The woven material may have a tensile strength of 200 to 400 N, preferably 250 to 350 N, for example 300N in the warp and 280N in the weft. The woven material may have a tear strength of 5 to 50 N, preferably 10-30N, for example 18 N. The woven material may have a colour fastness to any one or more of rubbing, perspiration or washing (40°) of 4 to 5. The woven material may have an abrasion of >50,000. The woven material may have a water resistant finish. For example, it may comprise woven polyester with a water repellent finish. The water repellent finish may be fluorocarbon based. The water repellent finish may be dyed heat set or boil off heat set.

The hot-melt adhesive may comprise any suitable type of hot-melt adhesive

The hot-melt adhesive may comprise one or more of a polyolefin, ethylene-vinyl acetate (EVA), polyurethane, polyvinylidene chloride (PVDC), silicon rubber, fluoropolymers, polycarbonate, styrene block co-polymer, polyester, polyamide, or polycaprolactone. In particular it may comprise EVA or co-polyester. In one embodiment the hot-melt adhesive is a polyolefin. In one embodiment the hot-melt adhesive is ethylene-vinyl acetate (EVA). In one embodiment the hot-melt adhesive is polyurethane. In one embodiment the hot-melt adhesive is polyvinylidene chloride (PVDC). In one embodiment the hot-melt adhesive is silicon rubber. In one embodiment the hot-melt adhesive is a fluoropolymer. In one embodiment the hot-melt adhesive is polycarbonate. In one embodiment the hot-melt adhesive is styrene block co-polymer. In one embodiment the hot-melt adhesive is polyester. In one embodiment the hot-melt adhesive is polyamide. In one embodiment the hot-melt adhesive is polycaprolactone. The hot melt-adhesive may have an area density of at least 5, 10, 15, 16 or 20 g/m², and/or no more than 50, 40, 35, 30 or 25 g/m² preferably 10-50 g/m², 16-35 g/m², 20-30 g/m², or 23-27 g/m², for example 25 g/m².

One preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein the hot-melt adhesive comprises EVA.

Another preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein the area density of the hot-melt adhesive is 20-30 g/m.

The woven comfort layer may have a thickness of 50 to 1000 micrometres, preferably 60 to 500 micrometres, more preferably 75 to 300 micrometres.

The hot-melt adhesive may have a maximum thickness, or an average (mean) thickness of less than 0.05 mm, less than 0.04 mm, less than 0.03 mm, less than 0.02 mm, or less than 0.0.01 mm, for example less than 0.005 mm. Providing the hot-melt adhesive as such a thin layer/web (compared to the prior art discussed above) reduces the amount required, with corresponding benefits in terms of cost, weight of starting material required, etc.

The web of hot melt adhesive may comprise a mass and a plurality of voids in the mass. The web may be a lattice, mesh or grid. The web may be a net or dots. The voids may be regularly spaced. The voids may be irregularly spaced. The voids may be regularly shaped. The web may have a regular and consistent distribution of adhesive. The voids may be irregularly shaped. The web may have an irregular and inconsistent distribution of adhesive. Each void may contain an absence (i.e. a substantial absence) of hot-melt adhesive applied to the woven fabric layer compared to the mass.

The voids may make up at least 20%, at least 30%, at least 40%, at least 50%, at least 60%, or at least 70% of the web.

Accordingly one preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; and wherein the hot melt adhesive is a web comprising a mass and a plurality of voids in the mass.

Another preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein the hot melt adhesive is a web comprising a mass and a plurality of voids in the mass and wherein the voids make up at least 50% of the mass.

A web of this type can thus be much thinner and/or made of much less material than a full film, as well as avoiding the rustling associated with films.

Therefore, by selecting these appropriate web properties, the mechanical properties of the comfort layer can be tuned. This increases the comfort for the user as the comfort layer's mechanical properties and the properties of the pouch as a whole, can be optimised so that it conforms to the body better than a pouch with more layers, provides a pleasant feel on the skin, and so forth.

The inside surface of the sheet of woven comfort material may be divided into one or more regions. The hot-melt adhesive may be applied to the region or one or more regions. Where there are two or more regions, specific properties of the web may be selected for each region. One or more of the regions may not have hot-melt adhesive applied to them. Therefore, the web can be selectively applied to areas of the pouch and the properties of the web can be adapted to suit the area of the pouch it is applied to. This allows the mechanical and adhesive properties of the web to be optimised depending on its location on the pouch which further enhances the performance of the pouch.

Another preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein the inside surface of the sheet of woven comfort material is divided into one or more regions and the hot-melt adhesive may be applied to the region or one or more regions.

Another preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein the inside surface of the sheet of woven comfort material is divided into one or more regions and the hot-melt adhesive may be applied to one or more regions and one or more of the regions do not have hot-melt adhesive applied to them.

A web of hot-melt adhesive may coat at least the upper part of the rear surface facing towards the ostomate in use; and a web of hot melt adhesive may coat at least the upper part of the layer of woven comfort material covering the front of the pouch. this has been found to be particularly effective in reducing sagging.

A web of hot-melt adhesive may coat at least the upper 10%, 20%, 30%, 40% or 50% of the rear surface facing towards the ostomate in use. A web of hot melt adhesive may coat at least the upper 10%, 20%, 30%, 40% or 50% of the layer of woven comfort material covering the front of the pouch.

At least a lower part of the layer of comfort material covering the front of the pouch may be not provided with a web of hot-melt adhesive. At least the lower 10%, 20%, 30%, 40% or 50% may be uncoated with a web of hot-melt adhesive. This can reduce cost as the lower part does not require the application of hot-melt adhesive and can achieve the same result in terms of avoiding sagging, possibly even better results, on account of a stiffer (coated) part at the top serving to reduce the likelihood of that part sagging, whilst a less stiff (uncoated) front lower part is more easily deformed.

Alternatively, the hot melt adhesive may be applied to the entirety (i.e. substantially the entirety) of the inside surface of the comfort material—this of course is easier to mass-produce than having to select particular areas to coat, and given the thinness of the web of adhesive and the presence of voids, it still involves applying a relatively small amount of material, certainly as compared to a complete film layer as in the prior art. The pouch may comprise at least one sheet of comfort material with the hot melt adhesive applied thereto (for example to its entirety) and at least one sheet of comfort material without the hot melt adhesive applied thereto. It may comprise at least two sheets of comfort material with the hot melt adhesive applied thereto and at least one sheet of comfort material without the hot melt adhesive applied thereto.

One or more regions where the hot melt adhesive is coated may include at least part of a periphery of the sheet of woven comfort material. The periphery of the sheet of woven comfort material may be aligned with the periphery of the pouch. Therefore, the pouch and comfort material can be welded together in a single weld that seals the pouch around its perimeter, maximising the capacity of the pouch.

A further component may be attached to the inside or outside surface of the woven comfort material. The region, or one or more of the regions where the hot melt adhesive is coated may be arranged to attach the further component to the woven comfort material. The further component may be arranged on the outside opposite the or a region of the hot melt adhesive or the inside. The further component may be attached to the woven comfort material by a weld. The weld may be facilitated by the hot-melt adhesive on the inside surface of the woven comfort material seeping through to bond to the component on the outside. The hot-melt adhesive may penetrate the fabric layer of the woven comfort material on welding. The hot-melt adhesive may adhere to the further component and fabric layer on welding. Therefore, the present invention provides convenient means for securing additional components to the pouch that can increase the functionality of the pouch.

Accordingly, one preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein a further component is attached to the outside surface of the woven comfort material opposite a region provided with hot-melt adhesive on the inside surface whereby the hot-melt adhesive penetrates the woven comfort material to bond the further component to the woven comfort material.

The ostomy pouch may comprise a cavity for storing stomal output. The cavity may be defined by at least one wall, for example a rear wall and a front wall. The rear wall and front wall may be substantially the same shape. The rear wall and front wall may be joined at their peripheries. The rear wall and front wall may be formed of flexible sheet material, for example plastics film. The rear wall and/or front wall may be opaque. The rear wall and/or front wall may be transparent. In particular at least part of the front wall may be transparent. The film may be formed for example of any one of polyurethane, polyethylene (PE), polyvinylidene chloride (PVDC), or ethylene-vinyl acetate (EVA). The film may have a thickness of 50 to 150 µm. The film may have a thickness of 75 to 100 µm. The rear wall and front wall may have corresponding inside and outside surfaces. The inside surfaces of the rear and front walls may form the interior of the cavity. The outside surfaces of the rear and front walls may form the exterior of the cavity. The sheet of woven comfort material may cover the outside surface of the front wall. The sheet of woven comfort material may be substantially the same shape as the front wall. A/the sheet of comfort material may be arranged adjacent to and facing an outside surface of a wall forming the exterior of the cavity, but at least partially unbonded thereto. For example, a/the sheet of comfort material may be bonded to the outside surface of a wall of the cavity at the periphery, but unbonded to the wall other than at the periphery. The hot melt adhesive may face the exterior of the cavity. At least part of the hot-melt adhesive on the inside surface of the comfort material may be adjacent, facing and unbonded to the outside surface of a wall (e.g the front wall) forming the exterior of the cavity.

Accordingly, one preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; the pouch comprising a cavity for storing stomal output; the cavity defined by a rear wall and a front wall joined at their peripheries and formed of flexible sheet material; the inside surfaces of the rear and front walls forming the interior of the cavity and the outside surfaces of the rear and front walls forming the exterior of the cavity; wherein the sheet of woven comfort material covers the outside surface of the front wall; and wherein at least part of the hot-melt adhesive on the inside surface of the comfort material is adjacent, facing and unbonded to the outside surface of the front wall.

A/the layer of woven comfort material covering the front of the pouch may comprise one or more parts. A/the layer of woven comfort material covering the front of the pouch may comprise an upper part and a lower part. The upper part and lower part when taken together may be the same shape as the front wall. The upper part may extend from a top edge of the pouch to a point 20-50% down its length from the top. The lower part may extend from a bottom edge of the pouch to a point 15-50% down its length from the top. An overlap region may be provided where the upper part and lower part overlap. The upper part may extend over the lower part (or vice versa) to form the overlap in the overlap region. The hot melt adhesive may be provided on one or both parts in the overlap region. In particular, the hot-melt adhesive may be provided on one or both parts at a periphery of the pouch, so as to ensure that these edges of the overlap region are bonded and the overlying part does not flap around. The upper part and the lower part may be separable from each other in the overlap region. The overlap region may extend horizontally when the ostomy pouch is in use. Thus, especially when the front wall is formed of a transparent film, the present invention provides a device that can permit convenient viewing of the stoma and/or the contents of the pouch if required.

Accordingly one preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein a layer of woven comfort material covering the front of the pouch comprises an upper part and a lower part, which overlap in an overlap region.

Another preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein a layer of woven comfort material covering the front of the pouch comprises an upper part and a lower part, which overlap in an overlap region; and the hot-melt adhesive is provided on one or both parts in the overlap region.

In addition, the free edges of upper and lower parts of the woven comfort material are protected from fraying by the hot-melt adhesive applied to the inside surface. This is effective where the entire inside surface has hot-melt adhesive applied thereto. However, embodiments may have hot melt adhesive applied in regions, in which the regions comprise the free edges of the top and bottom parts of the layer of woven material covering the front of the pouch.

The pouch may comprise a drain. The drain may be disposed at the bottom of the pouch in use. The drain may be formed from the front and rear walls of the pouch. The drain may be rectangular. The drain may be foldable. The drain may be foldable along its length. The drain may be movable between a folded and unfolded configuration. The drain may be in a closed state in its folded configuration. The drain may be in an open state in its unfolded configuration. When open, the drain may permit stomal output to leave the cavity of the pouch. When closed, the drain may prevent stomal output leaving the cavity of the pouch.

The drain may be provided with one or more pursing strips. The or each pursing strip may span the width of the drain. The or each pursing strip may extend the same distance along the length of the drain. The or each pursing strip may provide localised rigidity to the drain. The or each pursing strip may be formed from polystyrene. The or each pursing strip may define the locations and orientations of one or more folds of the drain. The or each pursing strip may comprise a strip of flexible material attached drain. The strip may have a higher rigidity than the material of the drain. The or each pursing strip may have some resilience once attached to the drain. Therefore, the pursing strips can be squeezed laterally to arch the pursing strip and thereby assist in opening the drain.

A pursing strip may be provided on the rear wall. The pursing strip may be provided adjacent a bottom end of the drain. The pursing strip may be provided on the outside surface of the rear wall. A pursing strip may be provided on the front wall. The front wall pursing strip may be provided on the outside surface of the front wall. The front wall pursing strip may be provided above the rear wall pursing strip. The front wall pursing strip may be provided midway between a top end and the bottom end of the drain. A longitudinal gap may be provided between an upper edge of the rear wall pursing strip and a lower edge of the front wall pursing strip. The longitudinal gap may define the location of a first fold of the drain.

A fastening element may be disposed on an outside surface of the rear wall. The rear fastening element may be disposed above the front pursing strip. A longitudinal gap may be provided between an upper edge of the front wall pursing strip and a lower edge of the second fastening element. The longitudinal gap may define the location of a fold of the drain. The rear fastening element may be disposed adjacent the top end of the drain.

A further component attached to a sheet of comfort material as set out above may be a closure mechanism for the drain of the ostomy pouch. The closure mechanism may be attached to a sheet of comfort material covering the front of the pouch. The closure mechanism may be attached to the outside surface of the comfort material. The closure mechanism may be a closure flap. The closure flap may be welded to the woven comfort material. It may be welded opposite a region of hot melt adhesive. The weld may be along a top edge of the closure flap. The closure flap may have an outside surface and an inside surface. The inside surface of the closure flap may be adjacent the outside surface of the comfort material. The closure flap may comprise a front fastening element. The front fastening element may cooperate to fasten with the rear fastening element. Fastening of the fastening elements may close the drain.

The closure flap (or further component generally) may comprise a plastic foam material. This is desirable as it imparts a rigidity desirable in a closure flap in particular, to keep the folded drain flat.

The closure flap (or further component generally) may comprise a woven comfort material (optionally comprising the hot-melt adhesive, e.g. a web thereof having the features set out above). This is desirable as forming the closure flap of the same material as the comfort material makes it more subtle/discreet.

The closure flap may extend across the majority of the width of the pouch. It may conform to the shape of the pouch. It may be arranged adjacent to a peripheral weld between the front comfort layer and the front wall. Extending across substantially all of the width of the pouch is unusual because normally closure flaps are attached not to the comfort material but to the material of the drain and must therefore be much narrower than the width of the pouch.

The front fastening element may be disposed above the rear fastening element. The front fastening element may be disposed adjacent a bottom edge of the comfort material. A longitudinal gap may be provided between an upper edge of the rear fastening element and a lower edge of the front fastening element. The longitudinal gap may define the location of a fold of the drain. The rear fastening element may be disposed adjacent the top end of the drain.

The drain may be closed by repeatedly folding the drain upwards about the fold lines defined by the front and rear pursing strips and front and rear fastening elements. The folded drain may be retained between the woven comfort material and closure flap. The sides of the closure flap may not extend beyond the edges of the comfort material. The closure flap may comprise a tab. The tab may extend beyond the bottom edge of the comfort material. The front and rear fastening elements may be the same size. The front and rear fastening elements may not span the width of the drain.

Therefore, the drain can be conveniently closed against the comfort material and secured in place with the closure flap. It is therefore not necessary to fold or secure the drain beneath the comfort material, making the pouch easier to use. The provision of a tab makes unfolding of the drain easier as the closure flap can be lifted allowing access to undo the fastening elements, as does the inclusion of fastening elements that do not span the entire drain width.

Accordingly, one preferred embodiment provides an ostomy pouch comprising a sheet of woven comfort material, the sheet of woven comfort material having an outside surface and an opposite inside surface, wherein the outside surface of the sheet of woven comfort material forms at least part of the outside surface of the pouch, and at least part of the sheet of woven comfort material is coated with a hot-melt adhesive; wherein the ostomy pouch comprises a foldable drain, wherein in a folded configuration, the drain remains within the external periphery of the ostomy pouch; wherein the drain is retained in the folded configuration by a closure means attached to the, or a, sheet of comfort material; and wherein the closure means comprises a flap welded to the woven comfort material along the flap's top edge.

The closure flap may have a contoured outline, for example the outline of a segment of a circle, which can give the base of the pouch a rounded appearance. This is considered preferable as a flat bottom is typically associated with "open" pouches (caused by the folding up of a drain at the bottom) whereas a rounded bottom may be seen as more stylish and not associated with the somewhat unpleasant draining process. Thus, although the pouch may be an open pouch the closure flap may make that less obvious.

According to a second aspect of the present invention, there is provided a method of forming an ostomy pouch, the method comprising: applying a hot-melt adhesive to at least part of one side of a sheet of woven comfort material to provide an inside surface comprising the hot melt adhesive; and bonding the insides surface of the sheet of woven comfort material to a wall of the pouch.

The second aspect may comprise providing a rear wall and a front wall which define a cavity for containing stomal output; arranging the inside surface adjacent the rear wall and/or the front wall; and bonding the inside surface of the sheet of woven comfort material to one or more of the rear wall and/or front wall of the ostomy pouch.

The method may comprise coating the at least part of one side of the sheet with hot-melt adhesive to form a coating. The method may comprise applying the hot melt adhesive as a web.

As outlined in respect of the first aspect of the invention, the pouch is therefore formed with the woven fabric layer bonded to the rest of the pouch without the need for an additional adhesive, or specialist layer of film interjected between the comfort material and a wall of the pouch.

The hot-melt adhesive coating may be applied by any suitable method. The hot-melt adhesive may be applied by: roll coating; scatter coating, extrusion coating; spray coating; slot coating; or foam-in-place coating.

The step of applying the hot melt adhesive to one side of a sheet of woven comfort material may be conducted separately from the step of bonding the inside surface of the sheet of woven comfort material to a wall of the pouch. For example, it may be conducted temporally separately, e.g. a least 5 minutes, 10 minutes, 1 hour, 12 hours, of 24 hours before bonding the inside surface of the sheet of comfort material to the wall. This allows the hot-melt adhesive to be dry when the sheet o woven comfort material is handled, thus enhances handleability (whereas involving a wet adhesive in the process would make handling more difficult).

Alternatively/additionally, the step of applying hot melt adhesive to one side of a sheet of woven comfort material may be conducted physically separately from the step of bonding the inside surface of the sheet of woven comfort material to a wall of the pouch. For example it may be conducted in a separate room, separate building or separate city, county or state. Similarly this separation of wet adhesive from the place where the pouches are formed has benefits in terms of cleanliness and simplicity.

In one preferred embodiment the method comprises: coating at least part of one side of a sheet of woven comfort material with a hot-melt adhesive to provide an inside surface comprising the coating; providing a rear wall and a front wall which define a cavity for containing stomal output; arranging the inside surface of the sheet of woven comfort material adjacent the rear wall and/or the front wall; and bonding the inside surface of the sheet of woven comfort material to one or more of the rear wall and/or front wall of the ostomy pouch; wherein the step of applying the hot melt adhesive to one side of a sheet of woven comfort material is conducted at least 1 hour before bonding the inside surface of the sheet of comfort material to the wall.

The rear wall and/or front wall may be transparent. The method may include bonding the coated sheet of woven comfort material directly to a transparent wall of the pouch. Therefore, the web of hot-melt adhesive facilitates bonding to wide range of materials that may be used in the pouch.

The method may include bonding the inside surface of the coated sheet of woven comfort material to one or more of the rear and/or front wall of the ostomy pouch. Welding may achieve bonding. The method may include bonding the inside surface of the coated sheet of woven comfort material to one or more of the rear and/front wall of the ostomy pouch at the periphery thereof. The sheet of coated woven comfort material may comprise one or more regions where the hot-melt adhesive is applied. The method may include bonding the woven comfort material to one or more of the rear and/or front wall of the ostomy pouch in a specific region or specific regions where the adhesive is applied.

In one preferred embodiment the method comprises: coating at least part of one side of a sheet of woven comfort material with a hot-melt adhesive to provide an inside surface comprising the coating; providing a rear wall and a front wall which define a cavity for containing stomal output; arranging the inside surface of the sheet of woven comfort material adjacent the rear wall and/or the front wall; and bonding the inside surface of the sheet of woven comfort material to one or more of the rear wall and/or front wall of the ostomy pouch; wherein the front wall comprises a transparent sheet of flexible material, and the method includes bonding the inside surface of the sheet of woven comfort material to the front wall.

The, or a, sheet of coated woven comfort may comprise two or more parts.

Where the comfort material comprises two or more parts, the method may include arranging a plurality of sheets of comfort material, each associated with one part. The method may include bonding the sheets of comfort material to the pouch. The bonding may be performed simultaneously. The bonding may be performed by welding. Thus, the present invention allows for complex arrangements of material to be applied to the pouch in a single manufacturing step, reducing the complexity and cost of production.

Where one or more sheet of coated woven material is provided on both the front and rear sides of the ostomy pouch and the layers are bonded together, a hot stamp may be applied to the rear side. This is beneficial as more adhesive will penetrate towards the hot stamp on the rear side which avoids any ugliness caused by visible penetration of adhesive through the woven material on the front side of the pouch.

The method may include attaching a further component to a sheet of coated woven comfort material. The method may include bonding the further component to the outside surface of the sheet of comfort material. The bonding may be achieved by welding. The hot-melt adhesive may penetrate the woven comfort material on bonding. The hot-melt adhesive may facilitate bonding of the comfort material and further component. As outlined above, the further component may comprise a closure mechanism, e.g. to close a drain of the ostomy pouch.

Accordingly, one preferred method of forming an ostomy pouch comprises: coating at least part of one side of a sheet of woven comfort material with a hot-melt adhesive to provide an inside surface comprising the coating; providing a rear wall and a front wall which define a cavity for containing stomal output; arranging the inside surface of the sheet of woven comfort material adjacent the rear wall and/or the front wall; and bonding the inside surface of the sheet of woven comfort material to one or more of the rear wall and/or front wall of the ostomy pouch; wherein the method includes the step of bonding at least one further component to the sheet of woven comfort material.

Another preferred method of forming an ostomy pouch comprises: coating at least part of one side of a sheet of woven comfort material with a hot-melt adhesive to provide an inside surface comprising the coating; providing a rear wall and a front wall which define a cavity for containing stomal output; arranging the inside surface of the sheet of woven comfort material adjacent the rear wall and/or the front wall; and bonding the inside surface of the sheet of woven comfort material to one or more of the rear wall and/or front wall of the ostomy pouch; wherein the method includes the step of bonding at least one further component to the sheet of woven comfort material; wherein the further component is bonded to the outside surface of the woven comfort material by the hot-melt adhesive penetrating the comfort material.

The method of forming an ostomy pouch according to the second aspect of the present invention may form the pouch according to the first aspect of the invention, optionally including any one or more optional features of the pouch according to the first aspect of the present invention.

According to a third aspect of the present invention, there is provided a method of forming a sheet of comfort material for an ostomy pouch, the method comprising: providing sheet of woven material; and coating at least part of one side of a sheet of woven comfort material with a web of hot-melt adhesive to provide an inside surface comprising the coating.

Again, the third aspect of the invention may include any optional feature associated with either the first or the second aspect of the invention. For example, the comfort material may be formed by one of the materials specified in relation to the first aspect of the invention, such as polyester, and/or the hot-melt adhesive may comprise any one of the materials specified in relation to the first aspect of the invention, such as EVA and/or the comfort material and/or hot-melt adhesive may have any of the properties set out above in relation to the first aspect of the invention.

According to a fourth aspect of the invention there is provided a method for collecting stomal output using an ostomy pouch according to any aspect described herein. The method may comprise attaching the ostomy pouch about a stoma of an ostomate. The ostomy pouch may be attached about the stoma through use of an ostomy wafer of the pouch where the pouch comprises a one-piece ostomy pouch. Alternatively, the method may comprise attaching an ostomy wafer of a body fitment component of a two-piece ostomy pouch about the stoma; and attaching a pouch to the body fitment component. The pouch may be attached to the body fitment component before or after the ostomy wafer has been attached about the stoma. Where the ostomy pouch comprises an open or drainable pouch, the method may comprise draining stomal output from the ostomy pouch.

Again, the fourth aspect of the invention may include any optional feature associated with any of the first to third aspects of the invention. For example, the comfort material may be formed by one of the materials specified in relation to the first aspect of the invention, such as polyester, and/or the hot-melt adhesive may comprise any one of the materials specified in relation to the first aspect of the invention, such as EVA and/or the comfort material and/or hot-melt adhesive may have any of the properties set out above in relation to the first aspect of the invention.

DETAILED DESCRIPTION OF THE INVENTION

In order that the invention may be more clearly understood one or more embodiments thereof will now be described, by way of example only, with reference to the accompanying drawings, of which:

FIG. 4 is a front view of an alternative ostomy pouch.

FIG. 5 is a cross-sectional side view of the ostomy pouch of FIG. 4.

Unless defined otherwise, all technical and scientific terms used in this specification have the same meaning as is commonly understood by the reader skilled in the art to which the claimed subject matter belongs. It is to be understood that the foregoing summary of the disclosure and the following examples are exemplary and explanatory only and are not restrictive of any subject matter claimed.

The following description is directed to embodiments of the disclosure. The description of the embodiments is not meant to include all the possible embodiments of the disclosure that are claimed in the appended claims. Many modifications, improvements and equivalents which are not explicitly recited in the following embodiments may fall within the scope of the appended claims. Features described as part of one embodiment may be combined with features of one or more other embodiments unless the context clearly requires otherwise.

In this specification, the use of the singular includes the plural unless the context clearly dictates otherwise. In this application, the use of "or" means "and/or" unless stated otherwise. Furthermore, use of the term "including" as well as other forms, such as "include", "includes," and "included," is not limiting.

As used herein, ranges and amounts can be expressed as "about" a particular value or range. About also includes the exact amount. For example, "about 5 mm" means "about 5 mm" and also "5 mm." Generally, the term "about" includes an amount that would be expected to be within experimental error. The term "about" includes values that are within 5% less to 5% greater of the value provided. For example, "about 30 mm" means "between 28.5 mm and 31.5 mm."

Figure 1:
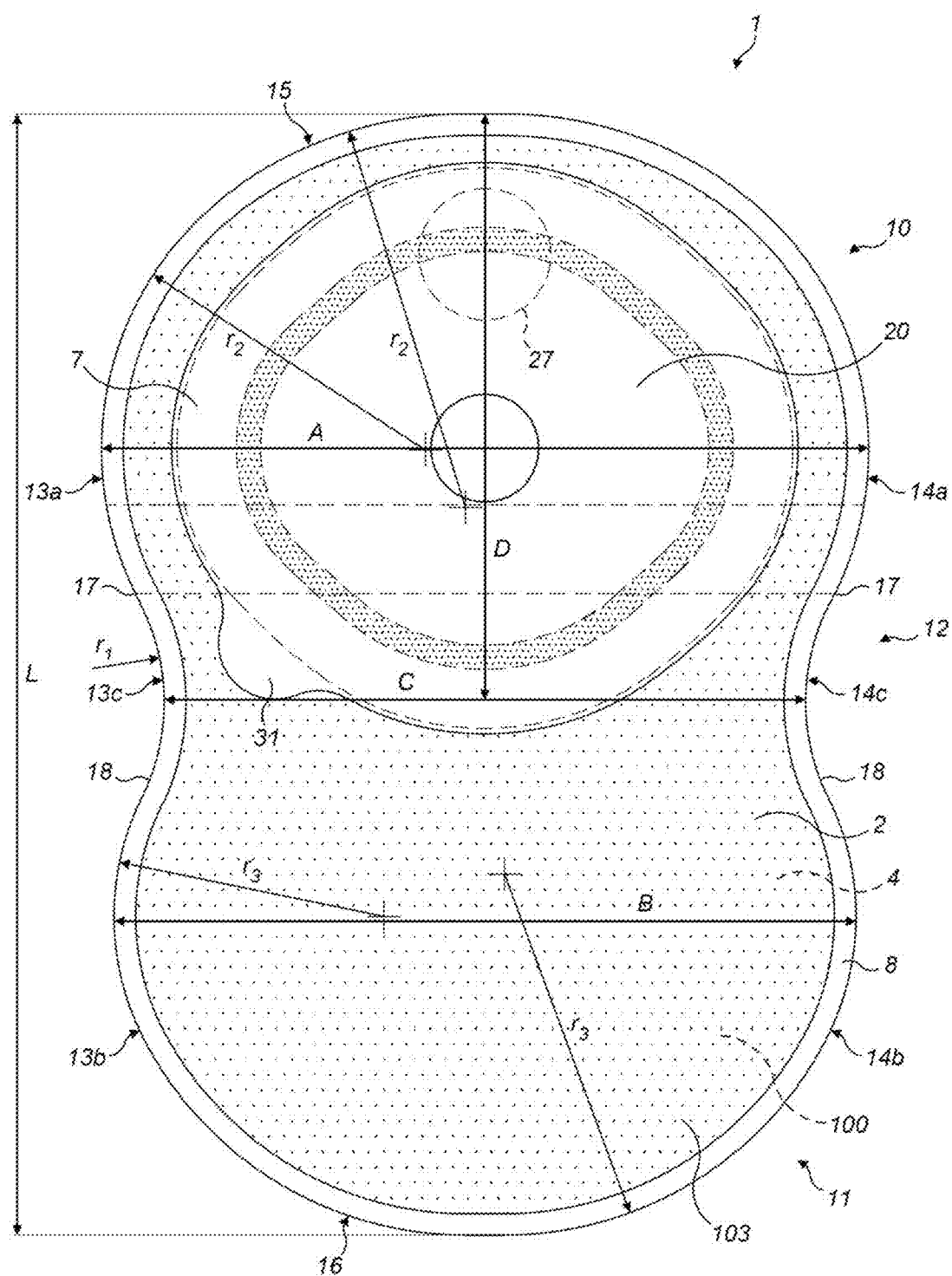
FIG. 1 is a rear view of an ostomy pouch.
Figure 2:
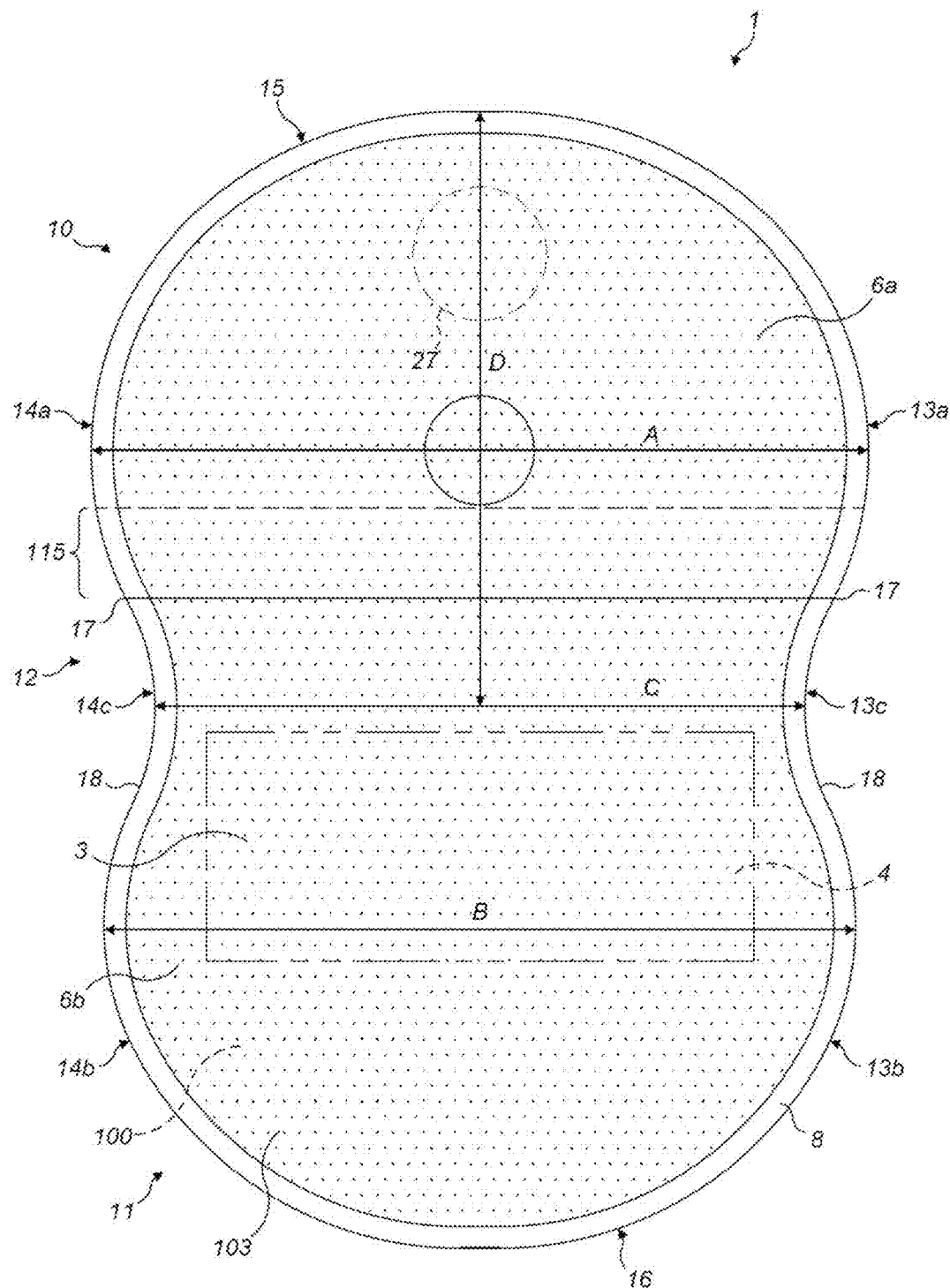
FIG. 2 is a front view of the ostomy pouch of FIG. 1.
Figure 3:
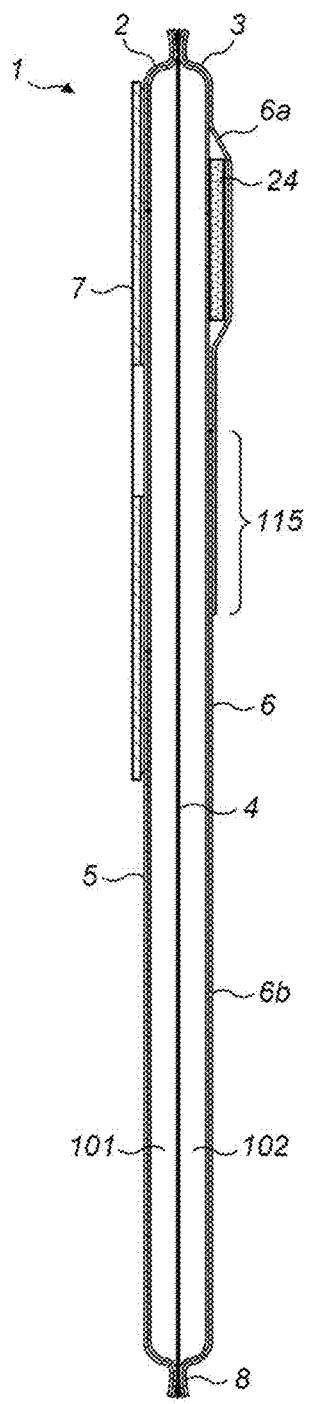
FIG. 3 is a cross-sectional side view of the ostomy pouch of FIG. 1.

Referring to FIGS. 1 to 3, an embodiment of the invention is shown in which an ostomy pouch 1 comprises a rear wall 2, a front wall 3, a separation wall 4, a rear comfort layer 5, a front comfort layer 6 and an ostomy wafer 7. In other embodiments within the ambit of the invention as claimed, one or more of the separation wall 4, the rear comfort layer 5 and the front comfort layer 6 may be omitted if desired.

In this embodiment, the ostomy pouch 1 is a one-piece pouch wherein the ostomy wafer 7 is permanently attached to the ostomy pouch 1 (in the sense that it cannot be easily removed and re-attached without damaging the pouch). However, other embodiments may be a two-piece pouch comprising a pouch component and body fitment component that together form the ostomy pouch. In some of these embodiments, the pouch comprises the rear wall 2, the front wall 3, the separation wall 4, the rear comfort layer 5 and the front comfort layer 6, and the body fitment component comprises the ostomy wafer 7.

The rear wall 2 and the front wall 3 define a cavity for containing a stomal output. In this embodiment, the rear wall 2 and the front wall 3 are both formed of flexible sheet material in the form of a plastics film and are joined together to define the cavity. An exemplary film is polyethylene (PE). The film typically has a thickness of 75 to 100 μm but in some embodiments may have a thickness of 50 to 150 μm.

In this embodiment, the ostomy pouch 1 has an upper section 10, a lower section 11 and a waisted section 12 that is located between the upper section 10 and the lower section 11. The upper section 10 has a maximum width, A, the lower section 11 has a maximum width, B, and the waisted section, 12, has a minimum width, C. In this embodiment, the maximum width, A, of the upper section 10 is greater than the maximum width, B, of the lower section 11, which in turn is greater than the minimum width, C, of the waisted section 12.

In this embodiment, the ostomy pouch 1 has a left-hand 13 and right-hand 14 edge when viewed from the rear. The waisted section 12 has a left-hand edge 13c and a right-hand edge 14c that are both smoothly rounded and merge into the respective left-hand edges 13a, 13b and right-hand edges 14a, 14b of the upper section 10 and the lower section 11.

The shape and dimensions of the ostomy pouch 1 are not particularly limited so long as it remains discreet and comfortable to wear in use. In this embodiment, the ostomy pouch has a length, L, of 208 mm, maximum width of the upper section A and lower section of 142 mm and 137 mm respectively, and a minimum width of the waisted section C of 119 mm. The minimum width, C, is located at a distance, D, from a top edge of the ostomy pouch 1, in this embodiment D is 119 mm.

In this embodiment, the left-hand edge 13c and the right-hand edge 14c of the waisted section 12 have concave curvature with a radius of curvature, r1, of 40 mm.

In this embodiment, both the upper 10 and lower 11 sections are rounded and comprise continuously curved edges 15, 16 respectively. The curved edges 15, 16 extend from the upper and lower ends of left-hand edge 13c of the waisted section 12 to the corresponding upper and lower ends of the right-hand edge 14c of the waisted section 12. The edges 15, 16 are convexly curved with a radius of curvature of r2 and r3 respectively. In this embodiment, the r2 and r3 are constant along their respective edges 15, 16, however in alternative embodiments they may be variable. r2 is in the range 55 mm and 75 mm, preferably 60 to 73 mm, and r3 is in the range 45 mm to 70 mm, preferably 50 mm to 67 mm.

In this embodiment, the upper section edge 15 incorporates the left-hand edge 13a and the right-hand edge 14a of the upper section 10 while the lower section edge 16 incorporates the corresponding left-hand 13b and right-hand edge 14b of the lower section.

In this embodiment, a junction between the upper section 10 and the waisted section 12 may be demarcated by a single point of inflection 17 between the edges 13a, 14a of the upper section 10 and the edges 13c, 14c of the waisted section 12. Similarly, a junction between the lower section 11 and the waisted section 12 may be demarcated by a single point of inflection 18 between the edges 13b, 14b of the lower section 11 and the edges 13c, 14c of the waisted section 12.

In this embodiment, the rear wall 2 and the front wall 3 are symmetrical about a vertical midline of the ostomy pouch 1. The rear wall 2 and front wall 3 are joined around their peripheral edges by use of welding. Welding is a preferred method of joining the rear wall 2 and the front wall 3 as it allows all the layers of the pouch 1 to be joined simultaneously, as described later.

In this embodiment, the rear wall 2 and the front wall 3 are joined together by a single continuous edge seal 8 that extends around a full perimeter of the rear wall 2 and the front wall 3 to create a fluid-tight seal. The single continuous edge seal 8 has a constant width of 4 mm around the perimeter of the ostomy pouch 1. In other embodiments, the width may be of different width, for example in the range 3 mm to 5 mm and may also vary around the perimeter.

The rear wall 2 is provided with a stomal inlet 20 for receiving the stomal output into the cavity. The stomal inlet 20 is an aperture that is cut out of the rear wall 2 in the upper section 10 of the ostomy pouch 1, in which the wafer 7 is provided, the wafer having a hole through which a stoma normally extends.

In this embodiment, the rear comfort layer 5 and front comfort layer 6 are substantially the same shape as the rear 2 and front 3 walls. The rear 5 and front 6 comfort layers form the outside of the ostomy pouch 1 and cover the rear 2 and front 3 walls respectively. The rear comfort layer 5 also comprises a wafer aperture that is in register with the stomal inlet 20 of the rear wall 2, in which the wafer 7 is arranged.

Figure 8:
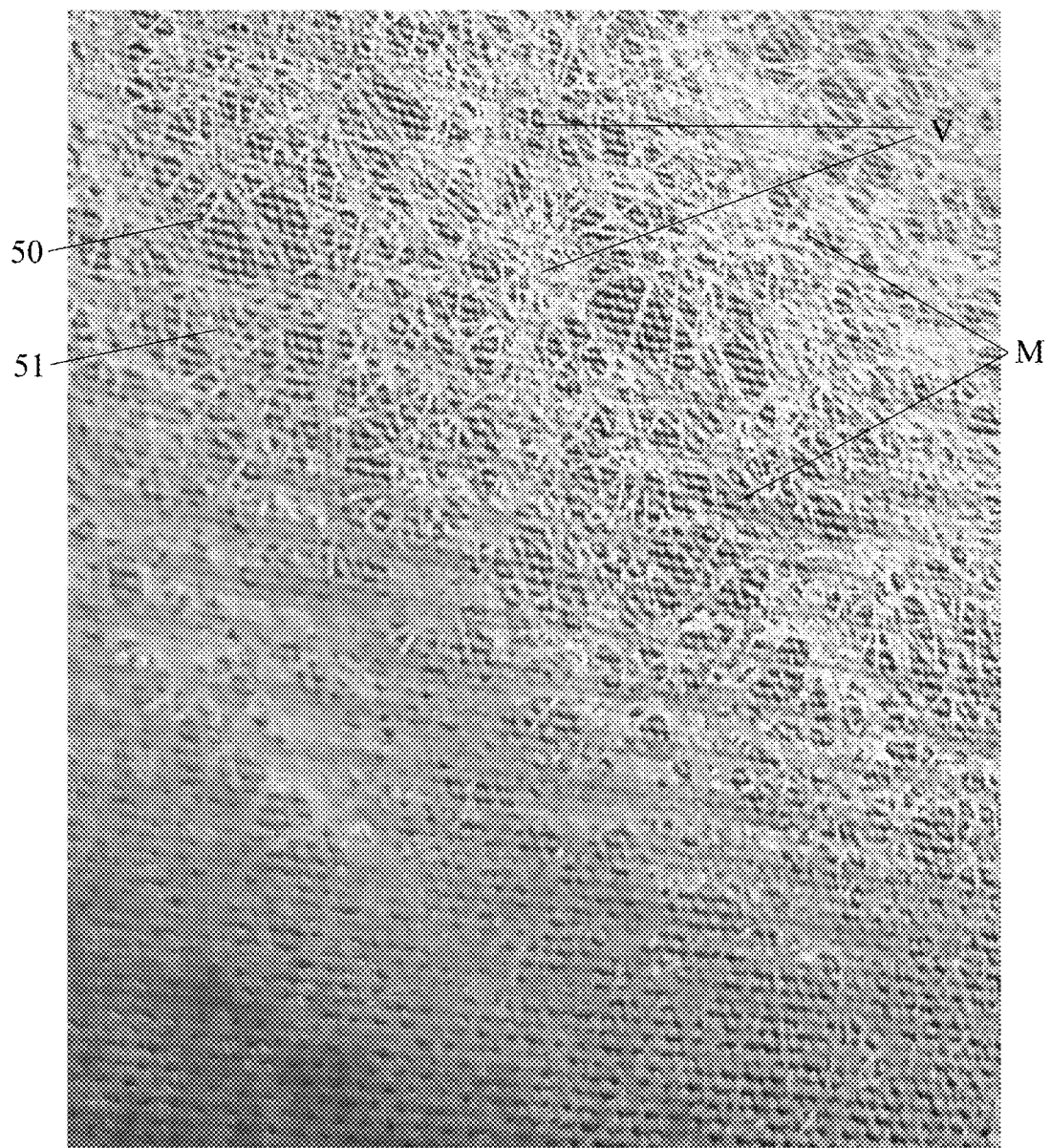
FIG. 8 is an partial view of the inside surface of the woven material which forms the comfort layer of the pouches of FIGS. 1-7 showing the hot-melt adhesive applied thereto.

The rear comfort layer 5 and the front comfort layer 6 are formed of a flexible sheet material comprised of a woven fabric layer 50 with a web of hot-melt adhesive 51 coated on one surface—its inside surface in use (see FIG. 8). In this embodiment, the fabric layer 50 forms the outside surface of the rear 5 and front 6 comfort layers respectively, with the web of hot-melt adhesive 51 disposed on the corresponding inside surfaces, facing the rear 2 and front 3 walls. Other embodiments may comprise additional fabric layers and/or adhesive layers as required. In this embodiment, the woven fabric layer comprises polyester but in other embodiments any one or more of nylon, viscose, polyethylene and polypropylene could be used in addition or as an alternative.

In this embodiment, the woven fabric layer has an area density of 58 g/m$^2$, a tensile strength of 280 to 300 N, and a tear strength of 18 N. Other embodiments may have different compositions, for example an area density of 50 to 70 g/m$^2$, a tensile strength of 200 to 400 N, and a tear strength of 10 to 30 N. Some embodiments may also have a colour fastness to any one or more of rubbing, perspiration or washing) (40° of 4 to 5, and an abrasion of >50,000. Certain embodiments also comprise a woven polyester with a water repellent finish. The water repellent finish may be fluorocarbon based and may be dyed heat set or boil off heat set. A suitable woven polyester layer is available from Newton Textiles Limited of Northamptonshire, UK, under the 75DCWR Designation, such as 75DCWRWHITE (for a white variant).

In this embodiment, the hot-melt adhesive comprises ethylene-vinyl acetate (EVA).

In another embodiment the hot-melt adhesive is a polyolefin.

In another embodiment the hot-melt adhesive is polyurethane.

In another embodiment the hot-melt adhesive is polyvinylidene chloride (PVDC).

In another embodiment the hot-melt adhesive is silicon rubber.

In another embodiment the hot-melt adhesive is a fluoropolymer.

In another embodiment the hot-melt adhesive is polycarbonate.

In another embodiment the hot-melt adhesive is styrene block co-polymer.

In another embodiment the hot-melt adhesive is polyester.

In another embodiment the hot-melt adhesive is polyamide.

In another embodiment the hot-melt adhesive is polycaprolactone.

In this embodiment, the web of hot-melt adhesive has an area density of 25 g/m$^2$. A suitable EVA hot-melt adhesive is available from Protechnic SA of Cernay, France under the designation 3Z8.

In this embodiment, the hot-melt adhesive is coated onto the fabric layer over an entire area of the rear 5 and the front 6 comfort layers. In other embodiments, the hot-melt adhesive may be coated to part of area of the rear 5 and front 6 comfort layers, or specific regions thereof. Where the web is formed, as shown in FIG. 8, it includes a mass M of hot-melt adhesive with numerous voids V therein, where there is an absence (or substantial absence, possibly including a trace) of hot-melt adhesive, thus it takes the general form of a lattice, mesh or grid. As can be seen, in this embodiment the voids are irregularly shaped and spaced and a relatively smaller area is covered by the mass than that which is free of adhesive in the voids. In other embodiments (not shown) the voids could be regularly shaped and/or regularly spaced.

Advantageously, the use of the hot melt adhesive allows both comfort layers 5, 6 and both walls 2, 3 to be joined together simultaneously in the same welding process if desired, in the same manner as a non-woven material would be attached, improving the bond, without the need for specialist intervening layers or the application of adhesive during the construction process. In this embodiment, the peripheral weld defined by the edge seal 8 also joins the rear comfort layer 5 to the rear wall 2 and the front comfort layer 6 to the front wall 3. In other embodiments, various welds may be used as required or desired. For example, the weld may only correspond to a portion of the weld joining the rear 2 and front 3 walls. The weld attaching the rear comfort layer 5 to the rear wall 2 may be different from the weld attaching the front comfort layer 6 to the front wall 3. In addition, the hot-melt adhesive 51 protects the fabric layers 50 from undesirable fraying.

In this embodiment, the front comfort layer 6 comprises an upper part 6a and a lower part 6b, which when taken together are the same shape as the front wall 3. The upper 6a extends from the top of the pouch 1 to the point of inflection 17 between the upper section 10 and waisted section 12. The lower part 6b extends from the bottom of the pouch 1, beneath the upper part 6a to a point slightly above the point of inflection 17. As such, the upper 6a part partially overlaps the lower part 6b in an overlap region 115. The upper part 6a and the lower part 6b are separable from each other in the overlap region 115 to form a window opening for viewing the cavity. The overlap region 115 extends horizontally when the ostomy pouch 1 is in use. In some embodiments, the overlap region 115 may not coincide with the point of inflection 17 and may span the pouch 1 at any suitable location along its length. Importantly, without the presence of the hot-melt adhesive 51, the two parts 6a, 6b, of the front comfort layer 6 would not bond to one another at all, regardless of the choice of material for the walls 2,3, because the material of the wall is not involved in the bond in that region. This therefore is a key region for the presence of the hot-melt adhesive.

In other embodiments, the front layer may be comprised of multiple parts. The external shape and dimensions of the multiple parts when taken together may be the same as that of the front wall 3.

In this embodiment, the ostomy wafer 7 is in register with the stomal inlet 20 of the rear wall 2 and extends through the wafer aperture of the rear comfort layer 5. The ostomy wafer 7 comprises an adhesive and a release liner 31. The ostomy wafer 7 is mounted to the rear wall 2 by welding. In other embodiments the wafer 7 may be mounted by any suitable alternative means (e.g. adhesive).

The ostomy pouch 1 may also be provided with a gas vent for venting of stomal gases from the cavity. In this embodiment, the ostomy pouch 1 comprises a gas vent filter 24 which is also an odour filter. Suitable filters could be a charcoal or activated carbon filter, for reducing the release of unwanted odours from the cavity. The gas vent filter 24 forms a part of the gas vent, which comprises a gas vent aperture 27 located in the front wall 3. In some embodiments, the gas vent filter 24 is covered by a filter cap and the gas vent filter 24 and filter cap are located on the front wall 3 over the gas vent aperture 27. The gas vent aperture 27 permits the passage of gas from the cavity towards an exterior of the ostomy pouch through the gas vent filter 24 and filter cap.

In this embodiment, the gas vent is located, in use, in the upper quarter of the ostomy pouch 1. In particular, the centre of the gas vent aperture 27 is disposed, in use, above the centre of the stomal inlet 20. In other embodiments, the gas vent may be located elsewhere in the upper section 10 of the ostomy pouch 1.

In this embodiment, the separation wall 4 is located between the rear wall 2 and the front wall 3. The separation wall 4 comprises a separation filter 100 for filtering stomal gases and/or stomal liquids from stomal solids contained in the stomal output. The separation filter 100 thus prevents stomal solids from contacting the gas vent and clogging or otherwise impairing the functionality of the gas vent filter 24.

In this embodiment, the separation wall 4 has the same external shape and dimensions as the rear wall 2 and the front wall 3 and divides the cavity of the ostomy pouch 1 into a first and a second chamber 101, 102. The first chamber 101 extends between the separation wall 4 and the rear wall 2, and the second chamber 102 extends between the separation wall 4 and the front wall 3. The first and second chambers 101, 102 have substantially the same volume. In other embodiments, they may have different volumes and/or the second chamber 102 may have a larger volume than the first chamber 101.

In this embodiment, the separation wall 4 is joined to the rear wall 2 and front wall 3 at their peripheral edges by use of welding to create a fluid-tight seal therebetween. In another embodiment, the separation wall 4 is joined to the rear 2 and front 3 walls about the whole of the edge of the upper section 10, and is additionally joined to the front wall 3 by a horizontal weld at the interface between the upper 10 and waisted 12 sections. Therefore, the joining of the separation wall 4 with the rear and front walls 2, 3 according to some embodiments of the invention may be such that the first and second chambers 101, 102 are sealed from one another other than via the separation filter 100.

In this embodiment, the separation wall 4 comprises a flexible sheet material, which may be formed of polyurethane, polyethylene (PE), polyvinylidene chloride (PVDC) and/or ethylene-vinyl acetate (EVA). In some embodiments, the flexible sheet material of the separation wall 4 has a thickness of 50 to 150 micrometres, preferably 75 to 100 micrometres. In this embodiment, the separation wall 4 comprises a hydrophobic and oleophobic coating applied to the flexible sheet material. In other embodiments, the flexible sheet material may be hydrophobic and/or oleophobic.

Figure 6:
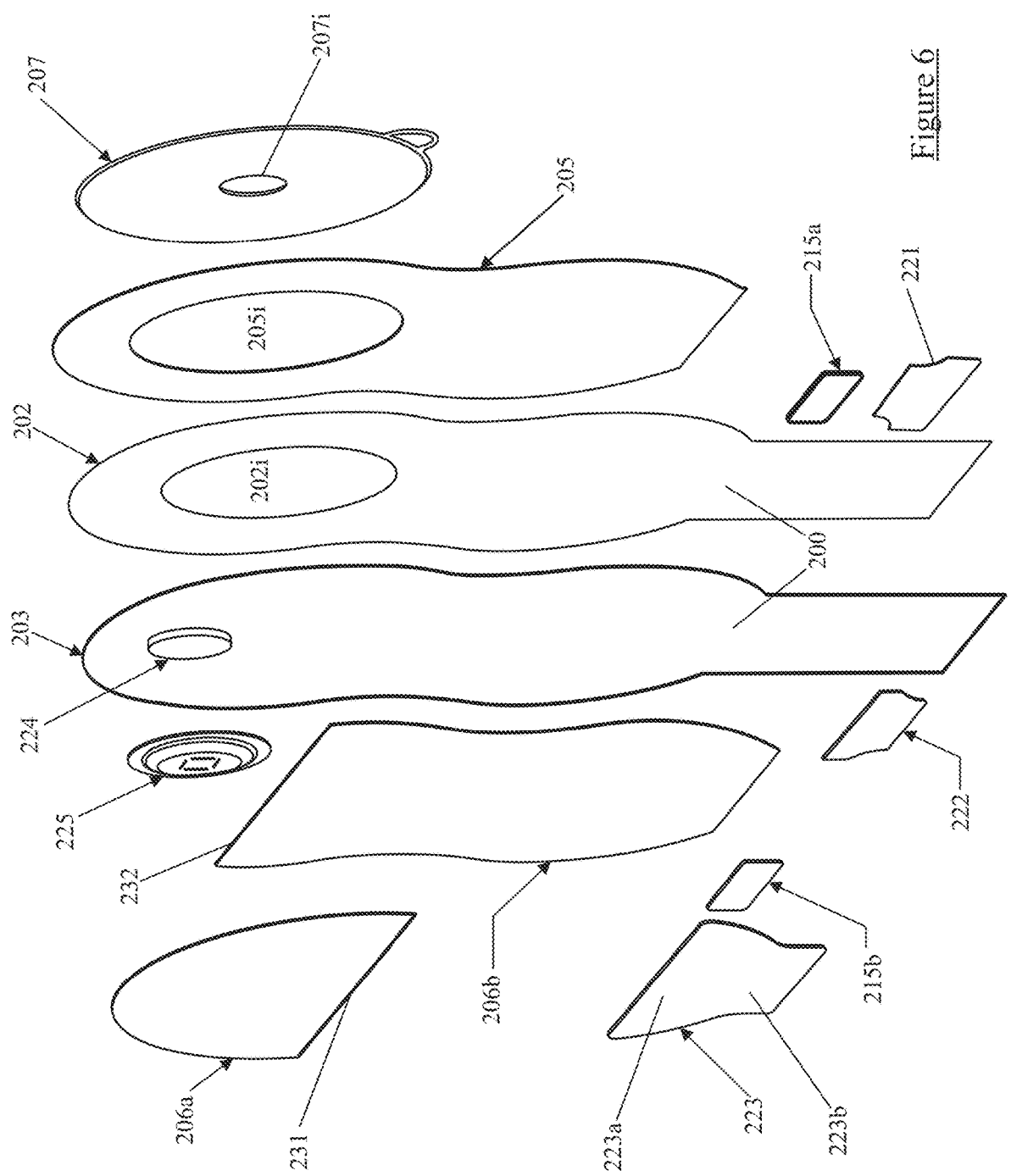
FIG. 6 is an exploded perspective view of the ostomy pouch of FIG. 4.

Referring to FIGS. 4 to 6, a further embodiment of an ostomy pouch 201 according to the present invention is similar to that shown in FIGS. 1 to 3, with like features having similar reference numerals. The main difference is that the lower section 211 of the further embodiment is shaped to accommodate/form a foldable drain. Thus, in contrast to the embodiments described above, this embodiment of the ostomy pouch 201 is an open pouch that does not comprise a sealed perimeter.

Moreover, in this embodiment, no separation wall is provided between the front 203 and rear 202 walls, and as such the cavity is not divided into two sections. The rear wall 202 features a large opening 202i in register with the stomal inlet 207i of the wafer 207 (which is connected to the rear wall 202 in the region between the periphery of the opening 202i and the periphery of the wafer, such that stomal output enters the cavity via the stomal inlet of the wafer and the opening 202i in the rear wall. The rear comfort layer 205 also features an opening 205i slightly larger than the opening 202i in the rear wall 202 and in register with it, so as to be sandwiched between the outermost edge of the wafer and the rear wall 202. The stomal inlet 207i is adjustable to fit the stoma of the ostomate.

In a similar fashion to the first embodiment, the front comfort layer 206 of this embodiment is formed of two parts: an upper part 206a; and a lower part 206b. The upper part 206a overlaps the lower part 206b across the majority of the width of the pouch 201 at a point on its height in register with the stomal inlet 207i. The overlap being defined by the lower edge 231 of the upper part 206a that overlaps the upper edge 232 of the lower part 206b.

In this embodiment, there is also an optional gas filter 224 positioned in the front wall 203 at a height above the stomal inlet 207i to allow gas to exit the pouch 201. in this embodiment, the filter 224 is covered by an optional filter cover patch 225 (not shown in FIG. 5) on the outside surface of the front wall 203. As such, the filter 224 and filter cover patch 225 are covered by the upper part 206a of the front comfort layer 206.

In this embodiment, the drain extends from the lower edge of the ostomy pouch 201 such that the pouch 201 has a length, L, of 290 mm when the drain is in an unfolded configuration. In other embodiments, the length may be a different size, for example in the range 250 mm to 300 mm.

In this embodiment, the lower section 211 comprises a drain aperture 40. The drain aperture 40 is an unsealed portion of the perimeter of the ostomy pouch 201 where the rear 202 and front 203 walls are not sealed.

In this embodiment, the lower section 211 comprises a rounded portion 211a and a substantially rectangular drain portion 41 that accommodates the drain aperture 40, with the rounded portion 211a being adjacent the waisted section 212 and the drain portion 41 being distal the waisted section 212. The drain portion 41 is foldable along its length between an unfolded and a folded configuration as described later.

In this embodiment, the lower section 211 comprises a continuous left edge 42 that extends from the left edge 213c of the waisted section 212 to a left vertex 44 of the drain aperture 40 around the curved left edge 42c of the generally rounded portion 211a and along a left edge 42d of the drain portion 41. Similarly, a continuous right-hand edge 43 extends from the right edge 214c of the waisted section 212 to a right vertex 45 of the drain aperture 40 around a continuously curved right edge 43c of the generally rounded portion 211a and along a right edge 43d of the drain portion 41. (Note that as FIG. 4 is a front view, the left edges of the pouch 1 are on the right of the figure and right edges of the pouch 1 on the left of the figure.)

In this embodiment, the curved left 42c and right edges 43c of the generally rounded portion 211a have convex curvature. The radius of curvature, r3, is similar to the radius of curvature r2 as described for the ostomy pouch shown in FIGS. 1 to 3. The left 42d and right 43d edges of the drain portion 41 are parallel to one another along the majority of their length.

In this embodiment, a single continuous edge seal 208 extends around the perimeter of the pouch 201 from the left vertex 44 of the drain aperture 40 to the right vertex 45 of the drain aperture 40, leaving the distal end of the drain aperture 40 open.

In this embodiment, the drain portion 41 defines an elongate drain passage that extends from the cavity of the ostomy pouch 201 to the drain aperture 40 located at a lower end of the drain portion 41. The drain portion 41 is integral with the lower section 211 and as such, the rear wall 202 and the front wall 203 may each be a single piece of material that includes the upper section 210, the waisted section 212 and lower section 211 (including the drain portion 41). However, in this embodiment, the rear comfort layer 205 and front comfort layer 206 do not cover the drain portion 41 of the rear wall 202 and the front wall 203.

In this embodiment, communication between the cavity and the elongate drain passage is via a drain inlet 200 defined as the point of transition between the cavity and the drain portion 41. The drain inlet 200 allows passage of stomal output from the cavity into the drain portion 41 when the drain portion 41 is unfolded.

In this embodiment, movement of the drain portion 41 between its unfolded or folded configuration opens or closes the drain aperture 40. This either permits or prevents outflow of the stomal output stored in the ostomy pouch 1 cavity.

In this embodiment, the drain portion 41 can be repeatedly folded in the same sense along its length into a plurality of segments having approximately equal segment lengths and separated by folds. The drain portion 41 may therefore be successively folded one or more times such that the segments overlie each other. Each fold is formed across the width of the drain portion 41 and acts to inhibit and preferably prevent passage of stomal output out of the drain aperture 40.

In this embodiment, first 221 and second 222 pursing strips are provided on the drain portion 41. The pursing strips 221, 222 provide both localised rigidity to the drain portion 41 and also define the locations and orientations of the segments and folds of the drain portion 41. The pursing strips 221, 222 comprise strips of flexible material attached drain portion 41, wherein the strips 221, 222 have a higher rigidity than the material of the drain portion 41. The pursing strips 221, 222 also have some resilience such that once attached to the drain portion 41, the pursing strips 221, 222 can each be squeezed laterally to arch the pursing strip and thereby open the elongate drain passage. In other embodiments, two or more pursing strips may be used.

In this embodiment, the pursing strips 221, 222 are formed from polystyrene, but other embodiments may comprise any suitable material.

In this embodiment, the first pursing strip 221 is attached to the rear wall 202 of the drain portion 41 adjacent the drain aperture 40. The second pursing strip 222 is attached to the front wall 203 of the drain portion 41 above the second strip 222. A longitudinal gap is provided between an upper edge of the first pursing strip 221 and a lower edge of the second pursing strip 222. The longitudinal gap therefore defines the location of a first fold of the drain portion 41. Each pursing strips 221, 222 spans the width of the drain portion 41 and extends the same distance along a length of the drain portion 41.

In this embodiment, a rear fastening element 215a is arranged on the rear wall 202 and a front fastening element 215b is arranged on a flap 223 that is mounted to the front comfort layer 206. In this example of a two-part front comfort layer 206, the flap 223 is mounted to the lower part 206b of the comfort layer 206. The rear fastening element 215a and the front fastening element 215b comprise corresponding hook-and-loop type fastener elements. The rear fastening element 215a is located on the drain portion 41 above the second pursing strip 222. A longitudinal gap is provided between an upper edge of the second pursing strip 222 and a lower edge of the rear fastening element 215a. The longitudinal gap therefore defines the location of a second fold of the drain portion 41.

In this embodiment, the flap 223 comprises a first flange 223a and a second flange 223b formed of one integral piece. The first flange 223a spans substantially all of the width of the lower rounded section 211a, but does not extend over the edge seal 208, at a point one third up the length of the rounded section 211a from the drain inlet 200. The first flange 223a is attached to the comfort material 206 by a single weld that spans substantially its entire width. This weld is made possible by the web of hot-melt adhesive 51 which coats the inside surface of the woven material 50 that the comfort material 206 is made from, which, when heated penetrates the woven material to bond with the material of the flap 223. The second flange 223b extends from the lower edge of the first flange 223a and is connected to the pouch 1 only by the first flange 223a. The second flange 223b is contoured so as to conform to the shape of the rounded portion 211a but is thinner, tracing the inside edge of the peripheral weld 208. As such, the second flange 223b extends downwards from the first flange 223a within the perimeter defined by the edge seal 208 of the pouch 201.

In this embodiment, the flap 223 has an outside surface, facing away from the ostomate in use and an opposite inside surface. The front fastening element 215b is located on the inside surface of the second flange 223b at a position above the rear fastening element 215a. A longitudinal gap is provided between an upper edge of the rear fastening element 215a and a lower edge of the front fastening element 215b and defines the location of a third fold of the drain portion 41. The flap 223 is formed from a flexible sheet material that is more rigid than the flexible sheet material of the rear wall 202, front wall 203 and comfort layers 205, 206. In this embodiment, the flap 223 is formed from a plastic foam which provides a desirable rigidity.

In an alternative, otherwise identical, embodiment, the flap 223 is formed of the same hot-melt coated woven comfort material as the comfort layer 206. Whilst this material is not as rigid as a plastic foam material, it is desirable aesthetically, as it matches with the remainder of the comfort layer, making the fact that the pouch is drainable less obvious.

Folding of the drain portion 41 may be carried out as follows. First, the distal end of the drain portion 41 is folded upwards and away from the rear of the ostomy pouch 201 about the first fold line to locate the first pursing strip 221 over the second pursing strip 222. Secondly, the drain portion 41 and the pursing strips 221, 222 are folded again, in the same sense, about the second fold line and then the third fold line such that the folded and stacked first pursing strip 221, second pursing strip 222 and first fastening element 215a are located beneath the second flange 223b of the flap 223 with the rear fastening element 215a being exposed and adjacent the front fastening element 215b. Finally, the second flange 223b of the flap 223 is pressed onto the folded drain portion to secure together the rear fastening element 215a and the front fastening element 215b.

In these embodiments, the drain portion 41 can then be unfolded by reversing the above procedure.

As in the first embodiment, in the second embodiment, the rear comfort layer 205 and the front comfort layer 206 are formed of a flexible sheet material comprised of a woven fabric layer 50 with a web of hot-melt adhesive 51 coated on one surface—its inside surface in use (see FIG. 8). In this embodiment, the fabric layer 50 is forms the outside surface of the rear 205 and front 206 comfort layers respectively, with the web of hot-melt adhesive 51 disposed on the corresponding inside surfaces, facing the rear 202 and front 203 walls. Other embodiments may comprise additional fabric layers and/or adhesive layers as required. In this embodiment, the woven fabric layer comprises polyester but in other embodiments any one or more of nylon, viscose, polyethylene and polypropylene could be used in addition or as an alternative.

In this embodiment, the woven fabric layer has an area density of 58 g/m$^2$, a tensile strength of 280 to 300 N, and a tear strength of 18 N. Other embodiments may have different compositions, for example an area density of 50 to 70 g/m$^2$, a tensile strength of 200 to 400 N, and a tear strength of 10 to 30 N. Some embodiments may also have a colour fastness to any one or more of rubbing, perspiration or washing) (40° of 4 to 5, and an abrasion of >50,000. Certain embodiments also comprise a woven polyester with a water repellent finish. The water repellent finish may be fluorocarbon based and may be dyed heat set or boil off heat set. A suitable woven polyester layer is available from Newton Textiles Limited of Northamptonshire, UK, under the 75DCWR Designation, such as 75DCWRWHITE (for a white variant).

In this embodiment, the hot-melt adhesive comprises ethylene-vinyl acetate (EVA).

In another embodiment the hot-melt adhesive is a polyolefin.

In another embodiment the hot-melt adhesive is polyurethane.

In another embodiment the hot-melt adhesive is polyvinylidene chloride (PVDC).

In another embodiment the hot-melt adhesive is silicon rubber.

In another embodiment the hot-melt adhesive is a fluoropolymer.

In another embodiment the hot-melt adhesive is polycarbonate.

In another embodiment the hot-melt adhesive is styrene block co-polymer.

In another embodiment the hot-melt adhesive is polyester.

In another embodiment the hot-melt adhesive is polyamide.

In another embodiment the hot-melt adhesive is polycaprolactone.

In this embodiment, the web of hot-melt adhesive has an area density of 25 g/m$^2$. A suitable EVA hot-melt adhesive is available from Protechnic SA of Cernay, France, under the designation 3Z8 and described by Protechnic SA as a web, but other hot-melts, such a co-polyester hotmelt web were evaluated successfully.

In this embodiment, the hot-melt adhesive is once again coated onto the fabric layer over an entire area of the rear 205 and the front 206 comfort layers. In other embodiments, the hot-melt adhesive may be coated to part of area of the rear 205 and front 206 comfort layers, or specific regions thereof. As mentioned above, where the web is formed, as shown in FIG. 8, it includes a mass M of hot-melt adhesive with numerous voids V therein, where there is an absence (or substantial absence, possibly including a trace) of hot-melt adhesive, thus it takes the general form of a lattice, mesh or grid. As can be seen, in this embodiment the voids are irregularly shaped and spaced and a relatively smaller area is covered by the mass than that which is free of adhesive in the voids. In other embodiments (not shown) the voids could be regularly shaped and/or regularly spaced.

Advantageously, the use of the hot melt adhesive allows both comfort layers 205, 206 and both walls 202, 203 to be joined together simultaneously in the same welding process if desired, in the same manner as a non-woven material would be attached, without the need for specialist intervening layers or the application of adhesive during the construction process and with adhesion even in regions where woven layers are joined to each other (i.e. the overlap) or to other materials that would not normally weld to a woven layer (such as the flap 223). In this embodiment, the peripheral weld defined by the edge seal 208 also joins the rear comfort layer 205 to the rear wall 202 and the front comfort layer 206 to the front wall 203. In other embodiments, various welds may be used as required or desired. For example, the weld may only correspond to a portion of the weld joining the rear 202 and front 203 walls. The weld attaching the rear comfort layer 205 to the rear wall 202 may be different from the weld attaching the front comfort layer 206 to the front wall 203. As set out before, the hot-melt adhesive 51 protects the fabric layers 50 from undesirable fraying.

Figure 9:
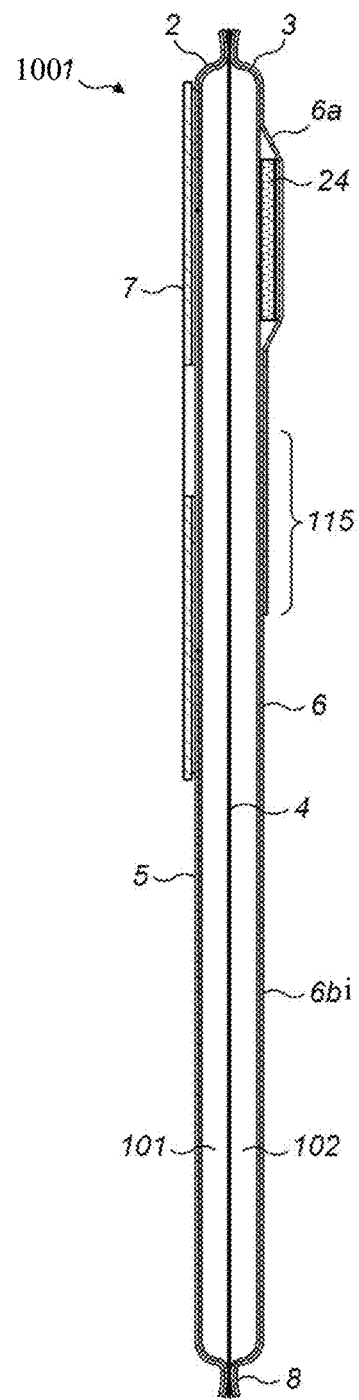
FIG. 9 is a cross-sectional side view of a further ostomy pouch.

Referring to FIG. 9, an embodiment of the invention is shown in which an ostomy pouch 1001 is identical to that of FIGS. 1-3 (hence corresponding numbering), with the exception that instead of comprising a front comfort layer 6 made up of an upper comfort layer 6a and a lower comfort layer 6b both coated in the hot-melt adhesive, in this embodiment the upper comfort layer 6a is identical and coated with hot-melt adhesive, but the lower comfort layer 6bi is uncoated.

Testing has shown that whilst providing both of the comfort layers 5, 6a which are present in the upper region of the pouch 1001 with the hot-melt coating has beneficial effects in terms of reducing the sagging of the pouch 1001 when filled, the lower part 6bi need not be coated to achieve this effect, and may even lead to a better shape if uncoated (and hence less stiff).

Figure 7:
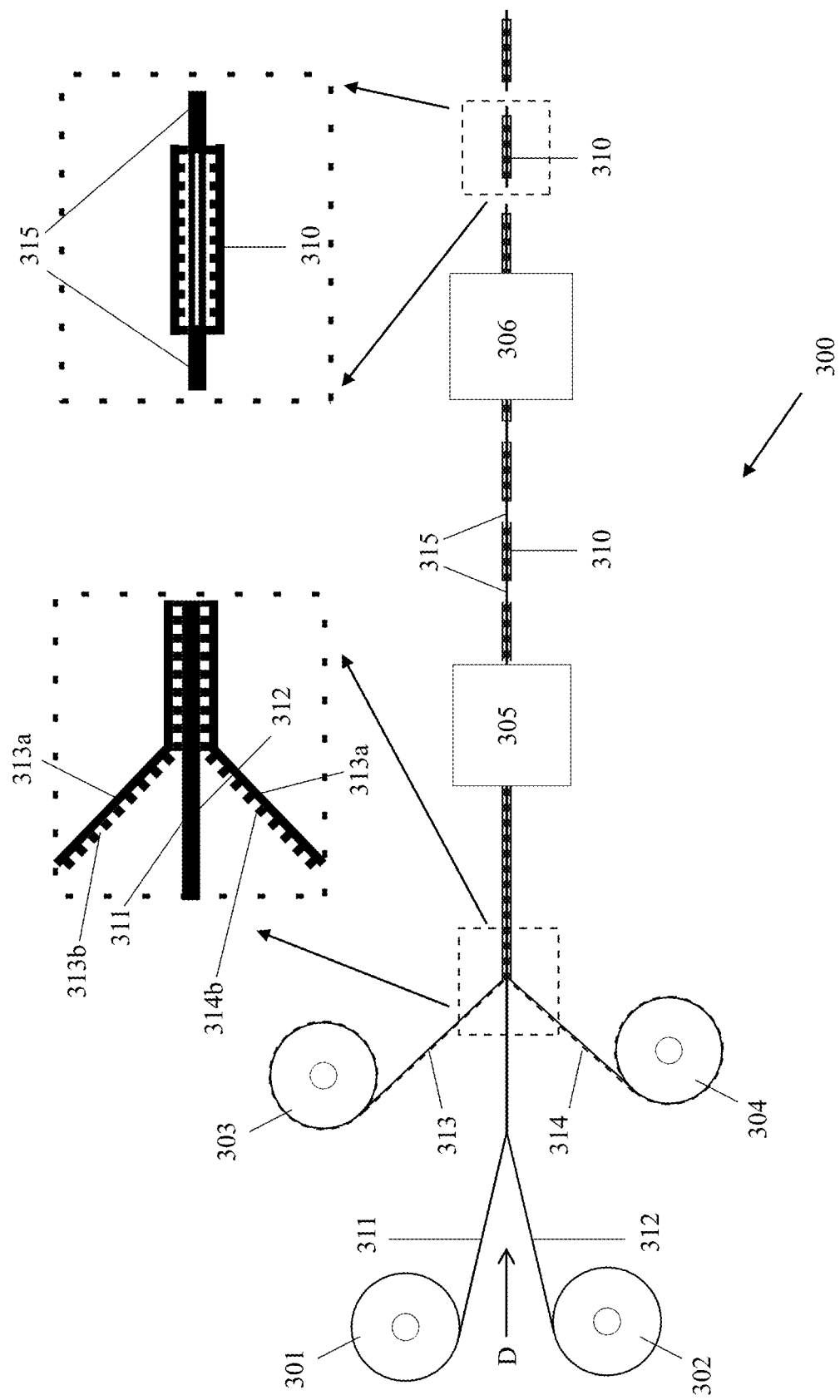
FIG. 7 is a side view of an apparatus for producing an ostomy pouch.

Referring to FIG. 7, apparatus for use in a method of forming the pouches of the invention is shown schematically. In this embodiment, an apparatus 300 comprises four rollers 301, 302, 303 and 304, a stamp welding machine 305, and a cutting machine 306. The rollers 301, 302, 303, 304 are used to advance a first 311, a second 312, a third 313 and a fourth 314 flexible sheet material respectively in the direction of the arrow, D. For simplicity, additional rollers used to advance the webs are not shown.

In this embodiment, the apparatus 300 is configured to construct an ostomy pouch 310 similar to the ostomy pouches 1, 201 of FIGS. 1 to 6 and 9 comprising a rear comfort layer 5, 205, rear wall 2, 202, front wall 3, 203 and front comfort layer 6, 206. However, the process is shown simplified, without features such as the separation layer 4 or aspects of the drain portion 41 described in the embodiments above and without any description of the assembly of the wafer, filter and so forth, which can be provided in manner which will be well known to those skilled in the art.

The first 311 and second 312 sheets of material are plastics film used for the rear and front walls of the pouch 310 respectively. As such, the materials used for these sheets are the same and correspond to that described in relation to the ostomy pouches 1, 201 described above.

In this embodiment, the third 313 and fourth 314 sheets of material are used for the rear and front comfort layers of the pouch 310 respectively. As described above, the material used for the comfort layers comprise a woven fabric layer 50 with a web of hot-melt adhesive 51 applied thereto. As such, the third 313 and fourth 314 sheets of material comprise a woven fabric layers 313a, 314a with adhesive webs 313b, 314b coated thereon. In FIG. 7, the webs of hot-melt adhesive (denoted by dashed lines) face towards one another, with the first and second layers of sheet material arranged between them.

The third 313 and fourth 314 sheets of material have been previously formed in a separate facility, days earlier, by a coating process, such as a roll-coating process, in which a thin sheet of EVA film is advanced from a roll and laminated under heat and pressure onto sheet of woven material 50 similarly advanced from a roll, then cooled and rolled onto a new roll, on which it is delivered. The thinness of the EVA film combined with the heating during lamination causes the formation of the voids V in the mass M of the EVA web 51 that is formed.

In this embodiment, the stamp welding machine 305 is arranged to weld together the layers of material using a hot stamp. The shape of the weld corresponds to the perimeter edge seal 8 as described in the ostomy pouches 1, 201 of FIGS. 1 to 3 and 4-6.

In this embodiment, the cutting machine 306 is arranged to cut sections of the advancing sheet of material in the shape defined by the perimeter of the ostomy pouch.

In this embodiment, first, the first 311 and second 312 sheets of material are brought together by rollers (not shown) such that they are in contact and advance at the same rate as one another. Next, the third 313 and fourth 314 sheets of material are brought together on opposite sides of the first 311 and second 312 sheets by rollers (not shown). The third sheet 313 is brought adjacent to the first sheet 311 such that the web of adhesive 313b faces the first sheet 311. Similarly, the fourth sheet 314 is brought adjacent the second sheet 213 such that the web of hot-melt adhesive 314b faces the second sheet 312. As such, all four sheets are in contact and advance at the same rate. The sheets thus are stacked in the following order: third 313; first 311; second 312; and, fourth 314.

In this embodiment, the advancing sheet of material then enters the stamp welding machine 305. The stamp welding machine 305 applies the heated stamp to the advancing sheet creating a sealed weld line 315 that corresponds to the perimeter of the ostomy pouch 310. The heated stamp is applied to the comfort layer which will be at the rear in use, since direct application of heat can cause the hot-melt adhesive to leak so far through the fabric layer as to become visible, it is preferred that this visibility is on the side not visible in use.

The webs of hot-melt adhesive 313b and 314b, facilitate the fabric layers 313a and 314a welding to the first 311 and second 312 layers. This process generates a series of sealed ostomy pouches 310 in the advancing sheets. In this embodiment, the stamping machine only welds around the perimeter of the pouches, leaving a cavity within the pouch 310.

In this embodiment, the advancing sheets then enter the cutting machine 306. The cutting machine cuts around the perimeter of the sealed weld line 315 created by the stamping machine 305. This frees each ostomy pouch 310 from the advancing sheets where they can be collected or further prepared. Welding and cutting could of course take place simultaneously.

In other embodiments, additional layers of material may be introduced. In one embodiment, a fifth sheet of comfort layer material is used (not shown) and is applied on the same side of the pouch as the third 313 sheet. This allows the front comfort layer to be comprised of an upper part 6a and lower part 6b or 6bi as described in relation to FIGS. 1 to 3 and 9 above, where for example, the third layer forms the lower part and the fifth layer forms the upper part. Advantageously, the third 313 and fifth sheets can be welded to the pouch simultaneously with the other layers, forming the pouch with an overlapping region 115 in a single stamp welding process.

The one or more embodiments are described above by way of example only. Many variations are possible without departing from the scope of protection afforded by the appended claims.

The invention claimed is:

1. An ostomy pouch comprising a sheet of woven comfort material, the sheet of woven comfort material having an outside surface and an opposite inside surface, wherein the outside surface of the sheet of woven comfort material forms at least part of the outside surface of the pouch, and the inside surface of the sheet of woven comfort material is coated with a hot-melt adhesive over an entire area of the sheet of woven comfort material, the hot-melt adhesive comprising a web comprising a mass and a plurality of voids in the mass making up at least 50% of the web; wherein a layer of the sheet of woven comfort material covering a front of the pouch comprises an upper part and a lower part, which overlap in an overlap region wherein the lower part is selectively separable from the upper part at the overlap region; and the hot-melt adhesive is provided on both the upper part and the lower part in the overlap region such that the upper part and lower part remain positioned adjacent one another along the overlap region unless the upper part and lower part are separated from one another at the overlap region by a user.

2. The ostomy pouch as claimed in claim 1, wherein the ostomy pouch comprises: a front surface facing away from an ostomate in use; and a rear surface facing towards the ostomate in use; wherein the sheet of woven comfort material is coated with a hot- melt adhesive on the inside surface forming both the front and rear surfaces of the pouch.

3. The ostomy pouch as claimed in any of claims 1 wherein the inside surface of the sheet of woven comfort material is divided into one or more regions with hot-melt adhesive applied to one or more of the regions.

4. The ostomy pouch as claimed in claim 3 wherein the or a region provided with hot-melt adhesive is arranged to attach a further component to the woven comfort material.

5. The ostomy pouch as claimed in claim 1 comprising a further component attached to the outside surface of the woven comfort material opposite a region provided with hot-melt adhesive on the inside surface whereby the hot-melt adhesive penetrates the woven comfort material to bond the further component to the woven comfort material.

6. The ostomy pouch as claimed in claim 1 wherein the ostomy pouch comprises a foldable drain, wherein in a folded configuration, the drain remains within an external periphery of the ostomy pouch; wherein the drain is retained in the folded configuration by a closure means attached to the, or a, sheet of comfort material; and wherein the closure means comprises a flap welded to the woven comfort material along the flap's top edge.

7. The ostomy pouch as claimed in claim 1 wherein the hot-melt adhesive comprises ethylene-vinyl acetate (EVA).

8. The ostomy pouch of claim 1 wherein the hot melt-adhesive has an area density of 20-30 g/m$^2$.

9. The ostomy pouch of claim 1 comprising a cavity for storing stomal output; the cavity defined by a rear wall and a front wall joined at their peripheries and formed of flexible sheet material; inside surfaces of the rear and front walls forming the interior of the cavity and the outside surfaces of the rear and front walls forming the exterior of the cavity; wherein the sheet of woven comfort material covers the outside surface of the front wall; and wherein at least part of the hot-melt adhesive on the inside surface of the sheet of woven comfort material is adjacent, facing and unbonded to the outside surface of the front wall.

* * * * *